United States Patent
Tsuji

(10) Patent No.: US 7,336,262 B2
(45) Date of Patent: Feb. 26, 2008

(54) COORDINATE-CAPTURING APPARATUS

(75) Inventor: Kenzo Tsuji, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 10/444,977

(22) Filed: May 27, 2003

(65) Prior Publication Data

US 2003/0197692 A1   Oct. 23, 2003

Related U.S. Application Data

(62) Division of application No. 09/778,714, filed on Feb. 8, 2001, now abandoned.

(30) Foreign Application Priority Data

Feb. 21, 2000   (JP)   ................................. 43106/00

(51) Int. Cl.
  *G06F 3/041* (2006.01)
(52) U.S. Cl. ...................................... 345/173
(58) Field of Classification Search ........ 345/156–158, 345/162, 173, 177, 179, 180, 184
See application file for complete search history.

(56) References Cited

U.S. PATENT DOCUMENTS

| | | | |
|---|---|---|---|
| 4,506,354 A * | 3/1985 | Hansen | 367/101 |
| 4,654,648 A * | 3/1987 | Herrington et al. | 345/179 |
| 4,758,691 A * | 7/1988 | De Bruyne | 178/18.09 |
| 4,777,329 A * | 10/1988 | Mallicoat | 178/19.02 |
| 4,814,552 A | 3/1989 | Stefik et al. | 178/18 |
| 4,862,152 A * | 8/1989 | Milner | 345/158 |
| 4,991,148 A * | 2/1991 | Gilchrist | 367/124 |
| 5,144,594 A * | 9/1992 | Gilchrist | 367/129 |
| 5,308,936 A * | 5/1994 | Biggs et al. | 178/19.02 |
| 5,637,839 A | 6/1997 | Yamaguchi et al. | 178/19 |
| 5,717,168 A | 2/1998 | DeBuisser et al. | 178/19 |
| 5,748,183 A * | 5/1998 | Yoshimura et al. | 345/173 |
| 6,208,330 B1 * | 3/2001 | Hasegawa et al. | 345/173 |
| 6,265,676 B1 * | 7/2001 | Zloter et al. | 178/19.01 |
| 6,292,177 B1 * | 9/2001 | Holtzman et al. | 345/173 |
| 6,300,580 B1 * | 10/2001 | Shenholz et al. | 178/19.02 |
| 6,335,723 B1 * | 1/2002 | Wood et al. | 345/173 |
| 6,414,673 B1 * | 7/2002 | Wood et al. | 345/173 |
| 6,529,189 B1 * | 3/2003 | Colgan et al. | 345/179 |
| 6,577,299 B1 * | 6/2003 | Schiller et al. | 345/179 |
| 6,724,371 B1 * | 4/2004 | Shenholtz et al. | 345/177 |

FOREIGN PATENT DOCUMENTS

| | | |
|---|---|---|
| EP | 0666543 | 8/1995 |
| GB | 1530188 | 10/1978 |
| JP | 64-7340 | 1/1989 |

* cited by examiner

*Primary Examiner*—Jeff Piziali
(74) *Attorney, Agent, or Firm*—Rabin & Berdo, P.C.

(57) ABSTRACT

A coordinate-capturing apparatus suitable for inputting handwritten characters or diagrams to a computer or a printer is disclosed. The apparatus includes an ultrasonic transmitter mounted on an input pen for transmitting ultrasonic waves, two ultrasonic receivers for receiving ultrasonic waves transmitted form the ultrasonic transmitter, and a distance calculating device for calculating distances between the input pen and the two ultrasonic receivers in order to determine coordinates representing a position of the input pen on the basis of the calculated distances. The apparatus of the invention can perform coordinate detection smoothly even when the input pen moves fast, and has reduced electric power consumption in the input pen to increase the life-span of a battery included in the input pen.

6 Claims, 15 Drawing Sheets

COORDINATE-CAPTURING APPARATUS

This application is a divisional of U.S. application Ser. No. 09/778,714, filed Feb. 8, 2001 now abandoned.

FIELD OF THE INVENTION

The present invention relates to a coordinate-capturing apparatus, to be more specific, relates to a coordinate-capturing apparatus suitable for inputting handwritten characters or diagrams to a computer or a printer.

BACKGROUND OF THE INVENTION

There are various types of coordinate-capturing system using a tablet and an input pen, including a pressure-sensitive type, an electrostatic-coupling type, an electromagnetic-coupling type, an ultrasonic in-medium propagation (surface acoustic wave) type, and an ultrasonic aerial-propagation type.

In each of the above conventional types except the ultrasonic aerial-propagation type, a sensor is built into a medium in the shape of a plate. Accordingly, they become too cumbersome to carry since their dimensions are determined by their input surfaces.

On the other hand, the ultrasonic aerial-propagation type has not the constraint of the input surface, and any surface can be used as the input surface. Japanese Unexamined Utility Model Publication No. 64-7340 discloses determining a position of a sounding object by receiving a sound wave emitted from the object by at least three microphones disposed on the same plane, determining at least two hyperbolic curves on each of which two associated microphones lie, on the basis of difference in timing of reception of the sound wave between the two associated microphones, and determining a point of intersection of at least two determined hyperbolic curves (refereed to as "3-ultrasonic-wave type"). U.S. Pat. No. 4,814,552 discloses a different method for determining coordinates of a position of a pen. In this method, an ultrasonic signal for position sampling and an electromagnetic signal for timing detection of emission of the ultrasonic signals are emitted from the pen, and are received by two ultrasonic receivers and one electromagnetic signal receiving element respectively. Then, time delays between reception of the electromagnetic signal and receptions of the ultrasonic sampling signal by the two ultrasonic receivers are measured to calculate distances between the pen and the ultrasonic receivers taking account the propagation speed of the ultrasonic signal, thereby determining the position of the input pen by trigonometry (referred to as "2-ultrasonic-wave+electromagnetic-wave type").

OBJECTS AND SUMMARY OF THE INVENTION

The above 3-ultrasonic-wave type has a problem that the determination of the position of the sounding object is greatly affected by the accuracy of positioning the three microphones, and therefore it is difficult to carry out the position-determination with high precision and high accuracy. In addition, since it is unknown at which microphone the ultrasonic signal arrives first, it is necessary to watch for the ultrasonic signal by the three microphones continuously, which requires a complicated circuit structure to perform complicated calculations, and therefore increases the cost of manufacturing.

In the 2-ultrasonic-wave+electromagnetic-wave type, to obtain a smooth curve of detected coordinates even when the pen moves fast, it is necessary to shorten a sampling period, that is, to shorten the period of emission of the electromagnetic signal from the pen. Besides, since electric power drawn for emitting ultrasonic signals is large, power consumption in the input pen is large and therefore a battery included in the pen is short-lived.

An object of the present invention is to make it possible to perform coordinate detection smoothly even when the input pen moves fast.

Another object of the present invention is to reduce electric power consumption in the input pen to increase the life-span of a battery included in the input pen.

The above objects are achieved by a coordinate-capturing apparatus comprising:

an ultrasonic transmitter mounted on an input pen to be in contact with a medium for transmitting ultrasonic waves;

a first and a second ultrasonic receivers for receiving ultrasonic waves transmitted form said ultrasonic transmitter;

a distance calculating device for calculating distances between said input pen and said first and said second ultrasonic receivers when a specific condition is satisfied;

a coordinate calculating device for calculating coordinates representing a position of said input pen on the basis of said distances calculated by said distance calculating device; and a distance variation calculating device for calculating variations of said distances between said input pen and said first and second ultrasonic receivers on the basis of time periods between receptions of an ultrasonic wave transmitted from said ultrasonic transmitter at a first time by said first and second ultrasonic receivers respectively and receptions of an ultrasonic wave transmitted from said ultrasonic transmitter at a second time by said first and second ultrasonic receivers respectively;

said distance calculating device calculating, on the basis of said distances calculated when said specific condition is satisfied and said variations of said distances calculated by said distance variation calculating device, distances between said input pen and said first and second ultrasonic receivers when said specific condition is not satisfied.

BRIEF DESCRIPTION OF THE DRAWINGS

Embodiments of the invention will now be described by way of example and with reference to the accompanying drawings in which.

DESCRIPTION OF THE PREFERRED EMBODIMENTS

Figure 1:
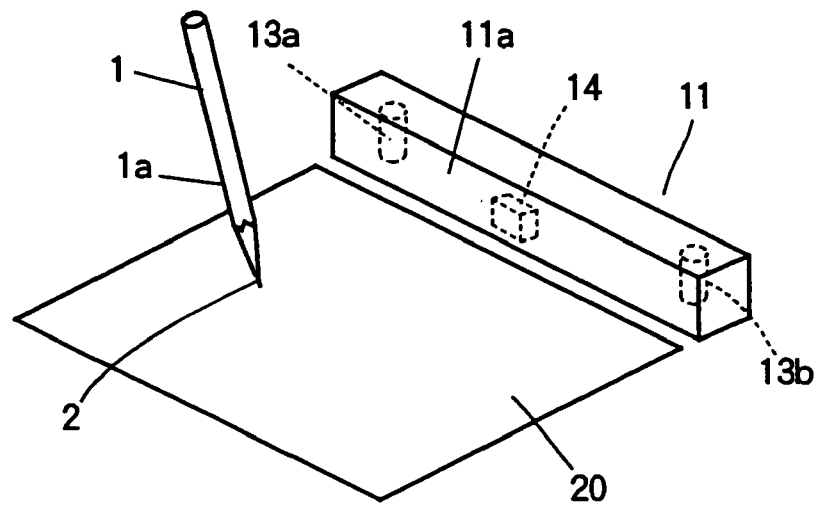
FIG. 1 is a schematically perspective view of a first embodiment.
Figure 2:
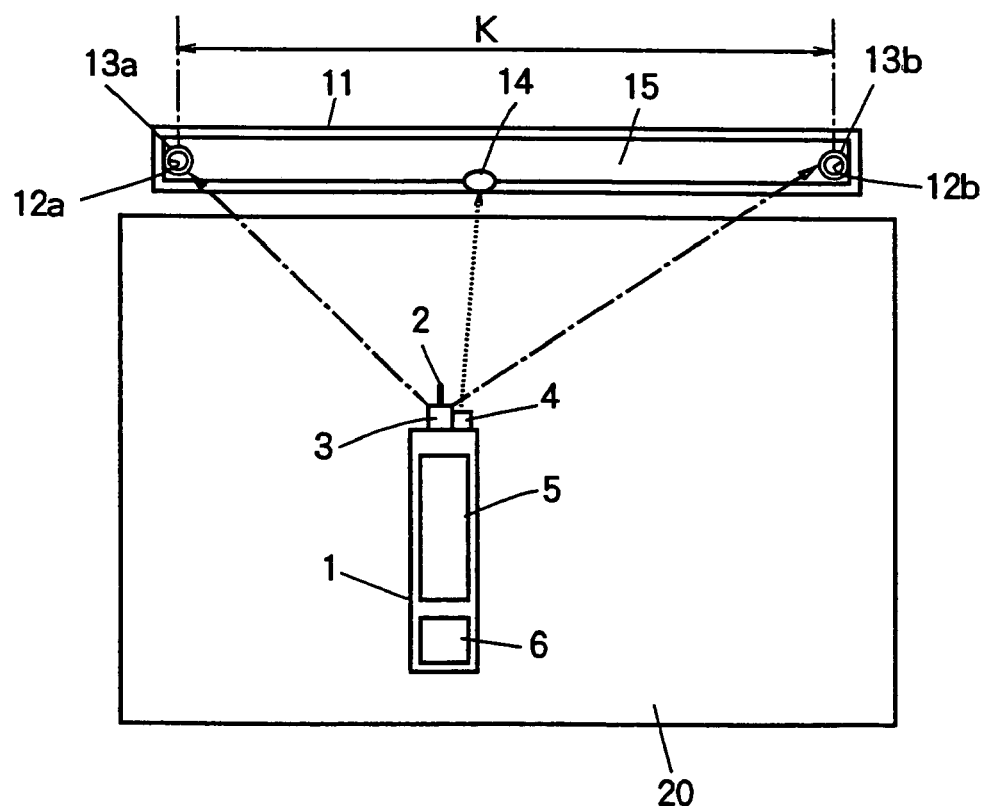
FIG. 2 is a top view of a coordinate-capturing apparatus of the first embodiment.
Figure 3:
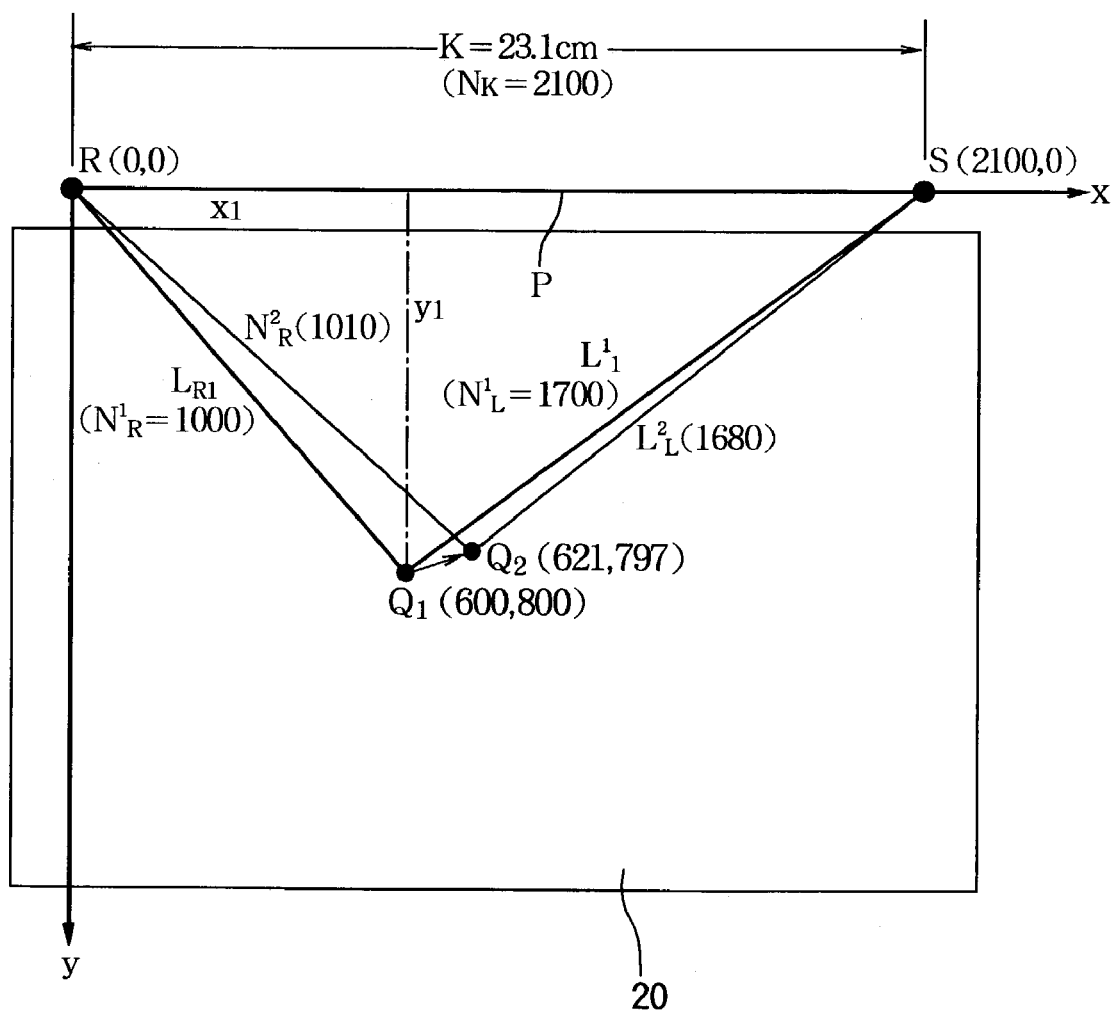
FIG. 3 is a view showing coordinates to be captured by the coordinate-capturing apparatus of the first embodiment.
Figure 4:
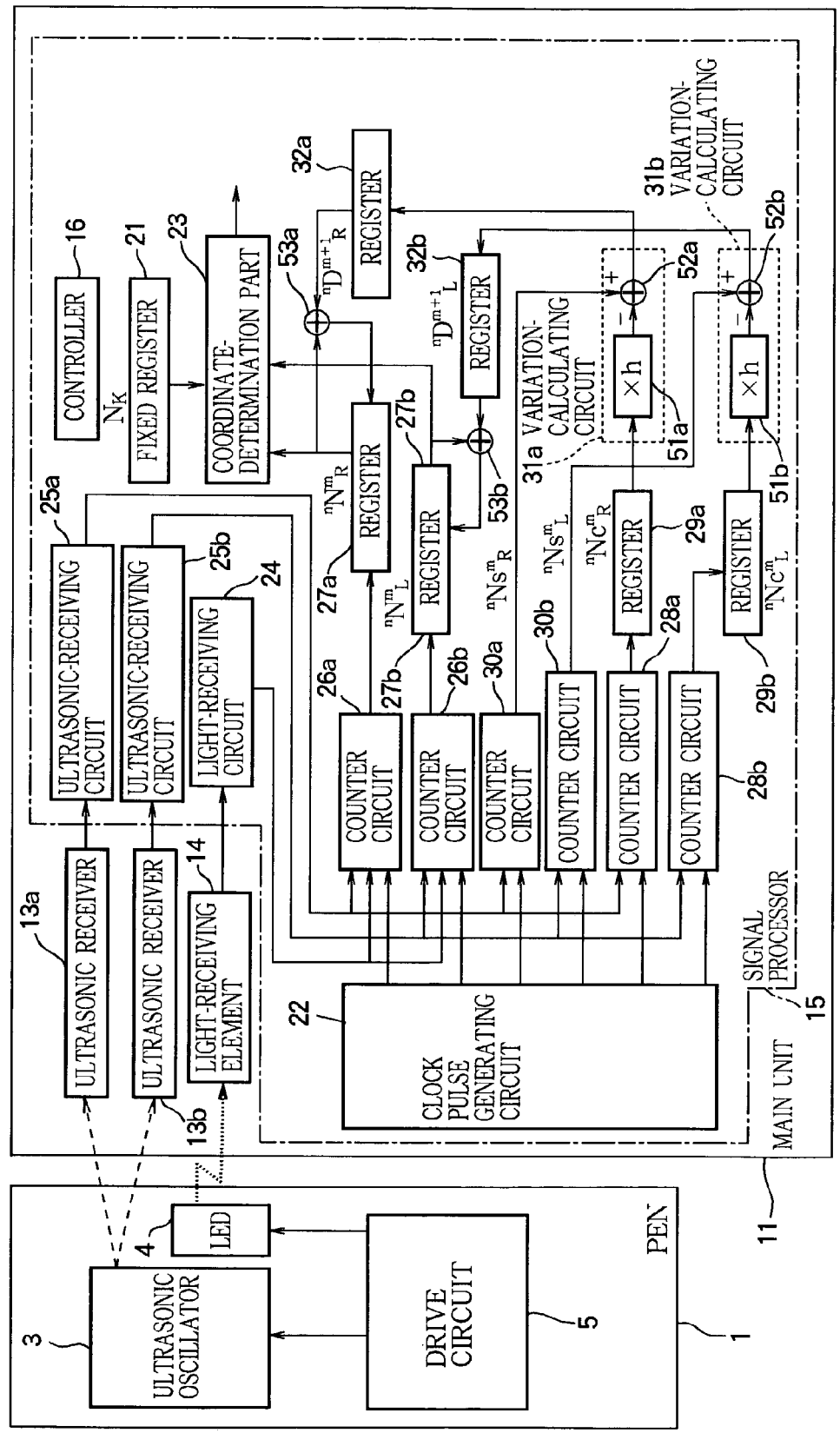
FIG. 4 is a block diagram showing a circuit structure of the coordinate-capturing apparatus of the first embodiment.
Figure 5:
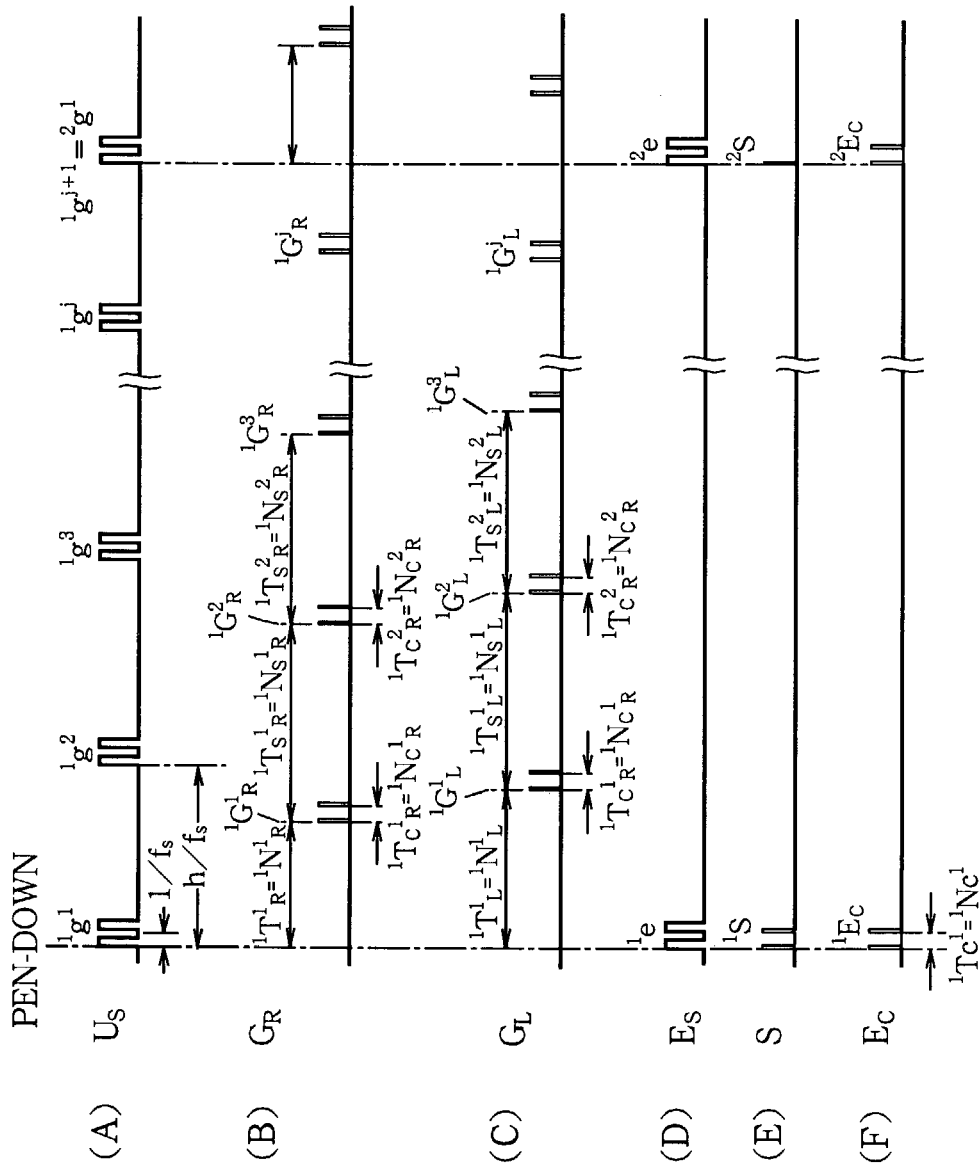
FIG. 5 is a time chart of various signals within the coordinate-capturing apparatus of the first embodiment.

FIG. 1 is a schematically perspective view of an embodiment of the coordinate-capturing apparatus according to the invention, FIG. 2 is a top view of the apparatus, FIG. 3 is a view showing coordinates to be captured, FIG. 4 is a block diagram showing a circuit structure of the apparatus, and FIG. 5 is a time chart of various signals within the apparatus.

As shown in FIGS. 1 and 2, the coordinate-capturing apparatus includes an input pen 1 for handwriting characters into a medium 20 such as a paper form, a main unit 11 which detects the coordinates of a locus of a tip portion of the input pen 1 when characters are written into the medium 20 by the input pen. The input pen 1 is sticklike.

The main unit 11 is in the shape of a rectangular parallelepiped as a whole. The medium 20 and the main unit 11 are placed on a not illustrated plane, for example on a desktop. The medium 20 is placed on the plane such that its top side is in contact with or close to a side of the main unit 11.

The main unit 11 captures coordinates of a position of the input pen 1 between the moment at which the input pen 1 comes in contact with the medium 20 and the moment at which the input pen 1 separates from the medium 20 at intervals of a predetermined sampling period. A state in which the input pen 1 is in contact with the medium 20 is referred to as "pen-down state", and a state in which the input pen 1 is separate from the medium 20 is referred to as "pen-up state" hereinafter. Furthermore, one action between a pen-down and a subsequent pen-up is referred to as one "pen-stroke" or "stroke".

Characters written by the input pen 1 include not only alphanumeric characters, Chinese characters, and Japanese syllabaries but also symbols, diagrams, etc.

The input pen 1 has a writing member 2 such as a core of a ballpoint pen for inking characters into the medium 20. The writing member is not limited to a core of a ball point pen. Any writing member can be used if it is long-life and easy to replace. The writing member is not indispensable for the apparatus of this embodiment. A sheet-type ultrasonic oscillator 3 of a polymeric material is wounded onto the surface of a jacket 1a at the tip portion of the input pen 1 (in the vicinity of the writing member 2). The ultrasonic oscillator 3 is not limited to such a sheet type of a polymeric material. For example, a piezoelectric device such as PZT ($PbZrO_3$—$PbTiO_3$) can be used. An LED (light emitting diode) 4 is provided in the vicinity of the ultrasonic oscillator 3.

A drive circuit 5 for driving the ultrasonic oscillator 3 and the LED 4, and a battery 6 are included in the input pen 1 (FIG. 2). The input pen 1 has a not illustrated switch for detecting a state in which the tip of the writing member 20 is pressed against the medium 20, that is, the pen-down state. The drive circuit 5 drives the ultrasonic oscillator 3 and the LED 4 while the pen-down state is detected by this switch.

A cylindrical-shaped member 12a is provided at one end portion of the main unit 11 so as to project vertically therefrom, and a sheet-type ultrasonic receiver 13a of a polymeric material is wound onto the side of this member 12a. A cylindrical-shaped member 12b is provided at the other end portion of the main unit 11 so as to project vertically therefrom, and a sheet-type ultrasonic receiver 13b of a polymeric material is wound onto the side of this member 12b.

The ultrasonic receivers 13a, 13b are not limited to such a sheet-type of a polymeric material. Any piezoelectric device such as PZT (PbZrO3—PbTiO3) can be used. A light-receiving element 14 is provided between the ultrasonic receivers 13a and 13b. As shown in FIG. 3, the ultrasonic receivers 13a, 13b are located at the points R and S respectively on the straight line P, and separated from each other by the distance K. The medium 20 has a plane including the straight line P. The main unit 11 includes a signal processor 15 to which the ultrasonic receivers 13a, 13b, and the light-receiving element 14 are connected.

The ultrasonic oscillator 3 and the drive circuit 5 of the pen 1 form an ultrasonic transmitter. The ultrasonic transmitter of this embodiment transmits a wave group (an ultrasonic pulse train) including p pulses having a frequency $f_S$ (p being 2 in FIG. 5) at a frequency $f_A = f_S/h$ in the pen-down state.

The LED 4 and the drive circuit 5 form a light signal transmitter. The light signal transmitter of this embodiment transmits a wave group (a light pulse train) including q pulses having a frequency $f_S$ (q being 2 in FIG. 5) at a frequency $f_B = f_A/j$ (j being a positive integer greater than 2, for example, 10) in the pen-down state.

The signal processor 15 has a clock pulse generating circuit 22, a light-receiving circuit 24, ultrasonic-receiving circuits 25a, 25b, counter circuits 26a, 26b, 28a, 28b, 30a, 30b, registers 27a, 27b, 29a, 29b, 32a, 32b, a fixed register 21, a coordinate-determination part 23, a variation-calculating circuits 31a, 31b, and adders 53a and 53b.

The clock pulse generating circuit 22 generates clock pulses having a predetermined frequency $F_D$ (3 MHz, for example) continuously at least in the pen-down state. The light-receiving circuit 24 receives an output of the light-receiving element 14 and outputs a corresponding pulse signal (FIG. 5(E)). This signal is used as a start signal S. The ultrasonic-receiving circuits 25a, 25b receive outputs of the ultrasonic receivers 13a, 13b, and output corresponding ultrasonic-reception pulse signals $G_R$, $G_L$ (FIGS. 5(B) and (C)).

The counter circuits 26a, 26b receive outputs of the clock pulse generating circuit 22, the light-receiving circuit 24, and the ultrasonic-receiving circuit 25a, 25b to measure the times elapsed between the moment at which the ultrasonic signal is emitted with the start signal S form the ultrasonic oscillator 3 and the moment at which it is received by the ultrasonic receivers 13a, 13b.

The registers 27a, 27b hold the count values of the counter circuits 26a, 26b after completion of the counts (time clocking) Thereafter, the counter circuits 26a and 26b are reset to provide for the next counts.

The counter circuits 28a, 28b receive outputs of the pulse generating circuit 22 and the ultrasonic-receiving circuits 25a, 25b, and count the number of the clock pulses generated between two successive pulses included in a pulse train generated at the ultrasonic-receiving circuits 25a, 25b. Thus, the time interval or pulse interval between two successive pulses can be determined.

The registers 29a, 29b hold the count values of the counter circuits 28a, 28b after completion of the counts (time clocking). Thereafter, the counter circuits 28a, 28b are reset to provide for the next counts.

The counter circuits 30a, 30b receive outputs of the pulse generating circuit 22 and the ultrasonic-receiving circuits 25a, 25b, and count the number of the clock pulses between generation of one pulse train and generation of the succeeding pulse train at the ultrasonic-receiving circuits 25a, 25b, that is, between reception of one pulse train and reception of the succeeding pulse train at the ultrasonic receivers 13a, 13b. Thus, the time interval between two successive pulse trains generated at the ultrasonic-receiving circuits 25a, 25b, that is, the time interval between two successive pulse trains received at the ultrasonic receivers 13a, 13b can be determined.

The variation-calculating circuits 31a, 31b have multipliers 51a, 51b and subtracters 52a, 52b. The multipliers 51a, 51b multiply the output of the registers 29a, 29b by a constant h respectively. The outputs of the multipliers 51a, 51b represent a time interval between two successive ultrasonic pulse trains transmitted from the ultrasonic oscillator 3. The subtracters 52a, 52b subtract the outputs of the multipliers 51a, 51b from the outputs of the counter circuits 30a, 30b respectively. The outputs of the subtracters 52a, 52b, which are also the outputs of the variation-calculating circuits 31a, 31b, represent variations of the distances between the input pen 10 and the ultrasonic receivers 13a, 13b.

The registers 32a, 32b hold the outputs (distance variations) of the variation-calculating circuits 31a, 31b respectively.

The adders 53a, 53b add the values held in the registers 32a, 32b to the values held in the registers 27a, 27b respectively. The results of the additions are held in the registers 27a, 27b respectively.

The fixed register 21 holds a value ($N_K$) representing the distance between the ultrasonic receivers 13a, 13b. The coordinate-determination part 23 calculates coordinates (x-y coordinates, for example) representing a position of the input pen by trigonometry from the value held in the fixed register 21 and the values held in the registers 27a, 27b representing the distances between the input pen and the ultrasonic receivers 13a, 13b. The result of this calculation is transferred to an external unit (not shown) such as a memory or a computer, and stored there.

This embodiment further includes a controller 16 for controlling the above-described components.

The operation of this embodiment will now be explained referring to FIGS. 4, 5, etc. As a first step, the receiver-to-receiver distance $N_K$ (the number of the clock pulses) representing the distance K between the ultrasonic receivers is calculated as described below and stored in the fixed register 21. When the propagation speed of an ultrasonic wave in the air is v and the time required for the ultrasonic wave to travel the distance K is $t_K$, the equation $K = v \cdot t_K$ holds. When the frequency of the clock pulses generated by the clock pulse generating circuit 22 is $F_D$, $t_K$ can be represented by the number of the clock pulses as $t_K = N_K/F_D$, and accordingly, the equation $N_K = K \cdot F_D/v$ ... (A1) holds. The coordinate-determining part 23 of the signal processor 15 sets up a rectangular coordinate system using the above $N_K$ calculated by the equation (A1), in which the straight line P makes an x axis in an x-y plane, the point R makes an origin point R(0, 0), and the coordinates of the point S are $S(N_K, 0)$.

Here, $F_D = 3$ MHz, K=23.1 cm, and the NK is calculated at 2100 from the equation (A1) assuming that the ultrasonic propagation speed is 330 m/sec. This calculated $N_K$ is held in the fixed register 21.

The principal of coordinate-detection with the input pen 10 will be explained below. At the start of a pen stroke, when the writing member 2 of the input pen 1 comes into contact with the medium 20 at the point Q1 shown in FIG. 3, the not illustrated switch turns on the drive circuit 5, whereby the ultrasonic oscillator 3 emits an ultrasonic signal $U_S$ and the LED 4 emits a light-signal $E_S$ at the same time. This moment conforms to PEN-DOWN in FIG. 5. As shown in FIG. 5(A), the ultrasonic signal $U_S$ is a wave group emitted at the frequency of $f_A = f_S/h$ from the start of the pen-down or the pen stroke, each group $^n g^m$ (m=1, 2 ..., j) including p pulses of the frequency of $f_S$. In this embodiment, p=2. The ultrasonic signal $U_S$ is received by the ultrasonic receivers 13a, 13b, and converted into electric pulses in the ultrasonic-receiving circuits 25a, 25b respectively to generate ultrasonic-reception signals $G_R$ and $G_L$. As shown in FIG. 5(D), the light signal $E_S$ is a wave group emitted at the frequency of $f_B = f_A/j$ (j being an integer equal to or greater than 2) from the start of the pen-down or the pen stroke, each group $^n e$ including q pulses of the frequency $f_S$. In this embodiment, q=2. The light signal $E_S$ is received by the light-receiving element 14, and processed in the light-receiving circuit 24 to generate the start signal S shown in FIG. 5(E). The time periods $^1T^1_R$, $^1T^1_L$ between generation of a first start signal $^1S$ and generation of first ultrasonic-reception signals $^1G^1_R$, $^1G^1_L$ in response to a first wave group $^1g^1$ of the ultrasonic signal $U_S$ can be assumed to be propagation times required for the ultrasonic signal to travel from the ultrasonic oscillator 3 to the ultrasonic receivers 13a, 13b. The propagation times $^1T^1_R$ and $^1T^1_L$ are measured as the number of the clock pulses $^1N^1_R$ and $^1N^1_L$ having the frequency $F_D = 3$ MHz generated by the clock pulse generating circuit 22, and stored temporarily in the registers 27a and 27b respectively. The numbers $^1N^1_R$ and $^1N^1_L$ of the clock pulses translate into the distances $^1L^1_R$, $^1L^1_L$ between the point $Q_1$ and the ultrasonic receivers 13a, 13b respectively. It means that they are expressed as the same unit as the receiver-to-receiver distance $N_K$. As seen from FIG. 3, three line segments corresponding to the distances $^1N^1_R$, $^1N^1_L$, and $N_K$ respectively form a triangle. Accordingly, the coordinate-determination part 23 can determine the position of the point $Q_1$ as its coordinates $Q_1(x_1, y_1)$ in the x-y coordinate system from the following equations (A2), (A3) by trigonometry. The determined position (coordinates) is stored in the memory (not shown), or transferred to the external unit such as a computer (not shown).

$$[^1N^1_R]^2 = [x_1]^2 + [y_1]^2 \tag{A2}$$

$$[^1N^1_L]^2 = [N_K - x_1]^2 + [y_1]^2 \tag{A3}$$

For example, if $F_D = 3$ MHz, and it has been detected that $^1N^1_R = 1000$, and $^1N^1_L = 1700$, it is determined that $x_1 = 600$, and $y_1 = 800$ since $N_K = 2100$. These determined values are stored in the memory (not shown), or transferred to the external unit such as a computer (not shown).

As described above, the distances between the pen and the ultrasonic receivers 13a, 13b are determined from the times elapsed between the emission of the ultrasonic signal along with the light signal and the receptions of the ultrasonic signal by the ultrasonic receivers 13a, 13b.

Subsequently, the counter circuits 28a, 28b count the numbers $^1Nc^1_R$, $^1Nc^1_L$ of the clock pulses generated at the frequency $F_D$ by the clock pulse generating circuit 22 to measure periods $^1Tc^1_R$, $^1Tc^1_L$ of the pulses of the ultrasonic-reception signals $^1G^1_R$, $^1G^1_L$ having the frequency $f_S$. These measurements are stored in the registers 29a, 29b and the counter circuits 28a, 28b are reset. Likewise, the counter circuits 30a, 30b count the numbers $^1Ns^1_R$ and $1Ns1L$ of the clock pulses generated at the frequency $F_D$ by the clock pulse generating circuit 22 to measure elapsed times $^1Ts^1_R$, $^1Ts^1_L$ between rises of the ultrasonic-reception signals $^1G^1_R$, $^1G^1_L$ and rises of second ultrasonic-reception signals $^1G^2_R$, $^1G^2_L$. At each of the risings of the second ultrasonic-reception signals $^1G^2_R$, $^1G^2_L$, the variation-calculating circuits 31a, 31b calculate the next variations $^1D^2_R$, $^1D^2_L$ by the following equations.

$$^1D^2_R = {}^1Ns^1_R - h \cdot {}^1Nc^1_R \tag{A4}$$

$$^1D^2_L = {}^1Ns^1_L \cdot {}^1Nc^1_L \tag{A5}$$

After the variations $^1D^2_R$ and $^1D^2_L$ are stored in the registers 32a and 32b, the registers 30a and 30b are reset. The variations $^1D^2_R$, $^1D^2_L$ in the registers 32a, 32b are added to the last values stored in the registers 27a, 27b by the adders 53a, 53b, and the results of the addition are held in the registers 27a, 27b. Accordingly, the contents of the registers 27a, 27b become below-described $^1N^2_R$, $^1N^2_L$ respectively.

$$^1N^2_R = {}^1N^1_R + {}^1D^2_R \tag{A6}$$

$$^1N^2_L = {}^1N^1_L + {}^1D^2_L \tag{A7}$$

The coordinate-determination part 23 determines the position of the point $Q_2$ as its coordinates $Q_2(x_2, Y_2)$ as in the case of determining the coordinates of the position of $Q_1$ from the three values of $^1N^2_R$, $^1N^2_L$ and $N_K$. The determined position is stored in the memory (not shown) or transferred to the external unit (not shown) such as a computer. In this embodiment, the frequency $f_S$ of the ultrasonic signal is about 50 KHz and the value of h is preset to 1,000 so that the wave group of the ultrasonic signal is transmitted at intervals of about 20 ms. Under such conditions, if it is found, when $F_D$=3 MHz, that $^1Nc^1_R$=59, $^1Ns^1_R$=59,020, $^1Nc^1_L$=59, $^1Ns^1_L$=58,990, it is determined that $^1D^2_R$=20, $^1D^2_L$=−10, and subsequently it is determined that $^1N^2_R$=1,020, $^1N^2_L$=1,690. Accordingly, the coordinates of the position of the point $Q_2$ can be determined as $Q_2$ (618, 812) from the above-described three values including $N_K$ (=2,100). What is meant by the above determination will be explained below. The pen is at the point $Q_1$ when the first wave group of the ultrasonic signal is emitted from the pen. The second wave group is emitted after a lapse of about 20 ms, which is equal to $h \cdot {}^1Nc^1_R$=1000×59=59,000 in the number of the clock pulses of the frequency $F_D$, from the transmission of the first wave group, and the pen moves to the point $Q_2$ at that time. On the other hand, $^1Ns^1_R$ and $^1Ns^1_L$ represent, in the number of the clock pulses of the frequency $F_D$, the times elapsed between the reception of the first wave group of the ultrasonic signal and the reception of the second wave group by the ultrasonic receivers. They vary depending on the distances between the point $Q_1$ and the ultrasonic receivers and the distances between the point $Q_2$ and the ultrasonic receivers. They decrease as the pen approaches the ultrasonic receivers and increase as the pen moves away therefrom. The variations $^1D^2_R$, $^1D^2_L$ represent variations of the distances between the pen and the ultrasonic receivers when the pen moves from the point $Q_1$ to the point $Q_2$. The determination of $^1D^2_R$=20 and $^1D^2_L$=−10 indicates that the pen has moved away from the ultrasonic receiver 13a and approached the ultrasonic receiver 13b.

When a third wave group arrives, the counter circuits 28a, 28b start counting again, and the counter circuits 30a, 30b are reset to start counting in order to calculate $^1D^3_R$ and $^1D^3_L$ by the following equations as in the case of calculating the coordinates of the point $Q_2$.

$$^1D^3_R = {}^1Ns^2_R - h \cdot {}^1Nc^2_R \tag{A8}$$

$$^1D^3_L = {}^1Ns^2_L - h \cdot {}^1Nc^2_L \tag{A9}$$

Next, $^1N^3_R$ and $^1N^3_L$ are calculated by the following equations.

$$^1N^3_R = {}^1N^2_R + {}^1D^3_R \tag{A10}$$

$$^1N^3_L = {}^1N^2_L + {}^1D^3_L \tag{A11}$$

Accordingly, a new position $Q_3$ of the pen is determined as its coordinates $Q_3$ ($X_3$, $Y_3$) by the values of $^1N^3_R$, $^1N^3_L$ and $N_K$. Likewise, each time the wave group $^1G^j$ arrives, $^1D^j_R$ and $^1D^j_L$ are calculated by the following equations.

$$^1D^j_R = {}^1Ns^{(j-1)}_R - h \cdot {}^1Nc^{(j-1)}_R \tag{A12}$$

$$^1D^j_L = {}^1Ns^{(j-1)}_L - h \cdot {}^1Nc^{(j-1)}_L \tag{A13}$$

Subsequently, $^1N^j_R$ and $^1N_{jL}$ are calculated by the following equations.

$$^1N^j_R = {}^1N^{(j-1)}_R + {}^1D^j_R \tag{A14}$$

$$^1N^j_L = {}^1N^{(j-1)}_L + {}^1D^j_L \tag{A15}$$

Thus, the coordinates $Q_j$ ($x_j$, $y_j$) of the point $Q_j$ are successively determined, and stored in the not illustrated memory, or transferred to the external unit such as a computer (not shown).

When a second start signal $^2S$ resulting from a second wave group $^2e$ of the light signal is generated, all the counter circuits and all the registers except the fixed register 21 are reset. At that time, a wave group $^1g^{(j+1)}$ of the ultrasonic signal is being emitted. This wave group $^1g^{(j+1)}$ can be expressed as $^2g^1$. The second start signal undergoes the same process as the first start signal.

Thereafter, the above-described process is repeated until the pen is separate from the input plane and the not-illustrated switch of the pen is turned off. Then, the drive circuit 5 stops operating, and all the counter circuits and all the registers except the fixed register 21 are reset. Subsequently, a series of coordinates determined while the writing member 2 is in contact with the input plane is stored as data of one pen stroke in a memory or transferred to an external processing apparatus (not shown).

When the writing member 2 comes into contact with the input plane again and the switch of the input pen is turned on, the above-described process is performed to determine a series of coordinates of a second pen stroke and transferred to the external processing apparatus. The same process is repeated for each pen stroke.

As described above, in the first embodiment, a time period (pulse period) between receiving a pulse in a pulse train of the ultrasonic signal and receiving the succeeding pulse is clocked, and this clocked time period is multiplied by the ratio (a predetermined value: h) of the period of the ultrasonic pulse train to the pulse period to determined the time elapsed between emission of a pulse train of the ultrasonic signal and emission of the succeeding pulse train at the ultrasonic oscillator 3.

In the first embodiment, the period of emission of the light signal is longer than the period of emission of the ultrasonic signal. The ratio j of the period of emission of the light signal to the period of emission of the ultrasonic signal is 2 or more. When the light signal and the ultrasonic signal are emitted at the same time, the distances between the pen and the ultrasonic receivers are determined on the basis of timings of receptions of these signals. On the other hand, when only the ultrasonic signal is emitted, distance variations are calculated and added to the last-determined distances to determine the current distances. Such a distance-update by calculation of distance variations brings about a buildup of an error, and therefore it is necessary to emit the light signal at times (at intervals longer than the ultrasonic signal emission period) to determine the distances directly. With such a process, it is possible to reduce the drain of the battery built in the pen since the frequency of the light signal emission is low.

Furthermore, by emitting the ultrasonic signal at short intervals, it is possible to follow rapid movement of the pen and thereby provide data representing a smooth locus of the pen.

The drain of the battery decrease as the ratio j increases. When the ratio j is infinite, that is, if the light signal is emitted only once at the start of a pen-down state, electric power consumption can be minimum.

Figure 6:
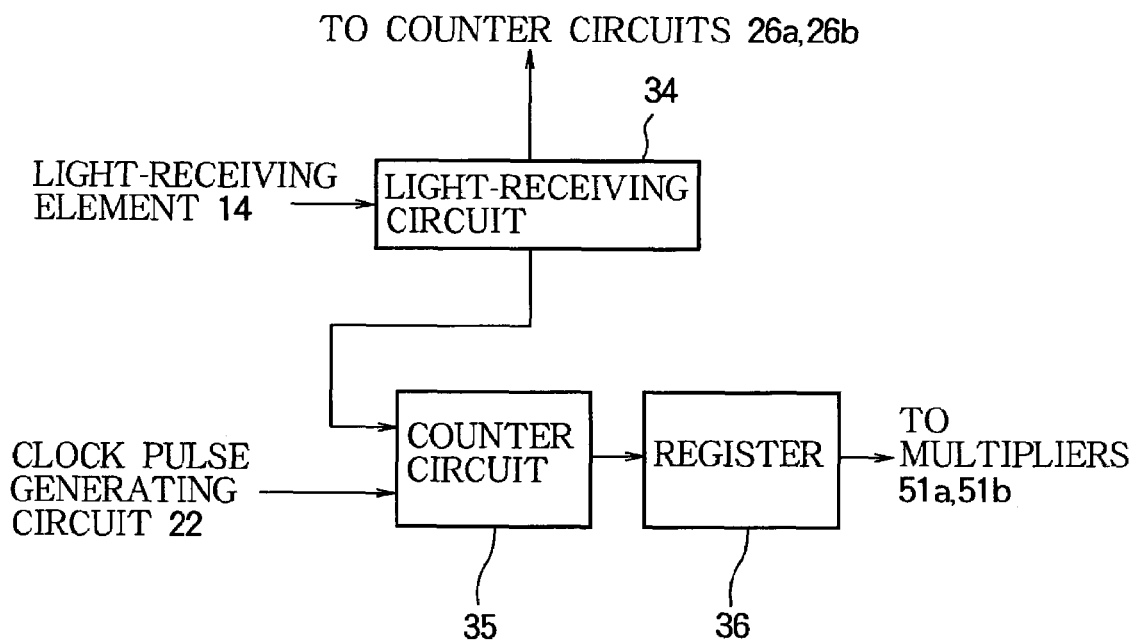
FIG. 6 is a block diagram explaining a circuit structure of a coordinate-capturing apparatus of a second embodiment.

The second embodiment of the invention will now be described. The structure of the second embodiment is about the same as the first embodiment. FIG. 6 is a view explaining the difference between the first embodiment and the second embodiment. As shown in FIG. 6, a light-receiving circuit 34 is used instead of the light-receiving circuit 24 shown in FIG. 4, a counter circuit 35 is used instead of the counter circuits 28a, 28b shown in FIG. 4, and a register 35 is used instead of the registers 29a, 29b shown in FIG. 4.

As described above, in the first embodiment, the periods $''Tc^m_R$, $''Tc^m_L$ of the ultrasonic pulses of the frequency $f_S$ and the time elapsed between emission of an ultrasonic pulse train and emission of the succeeding ultrasonic pulse train at the ultrasonic oscillator 3 are determined from the pulses of the ultrasonic reception signals $''G^m_R$, $''G^m_L$. On the other hand, the second embodiment is arranged such that the light signal $E_S$ is processed by the light-receiving circuit 34 in FIG. 6 to generate a start signal (FIG. 5(E)) and a wave group $''Ec$ (FIG. 5(F)) corresponding to the light signal $E_S$, in order to determine the period $''Tc$ of the ultrasonic pulses of the frequency $f_S$ from the wave group $''Ec$. That is, in the second embodiment, the period $''Tc$ of the pulses having the frequency $f_S$ of the light signal $E_S$ (the time elapsed between receiving one pulse of the light signal and receiving the succeeding pulse) is measured by the counter circuit 35 as the number $''Nc$ of the clock pulses having the frequency $F_D$ generated by the clock pulse generating circuit 22, and is stored in the register 36. The output $''Nc$ of the register 36 is used as a substitute for $''Nc^m_R$ and $''Nc^m_L$ in the first embodiment. The output of the register 36 is multiplied by the factor h at the multipliers 51a, 51b to determine the time elapsed between emission of a ultrasonic pulse train and emission of the succeeding ultrasonic pulse train (the period of emission of the ultrasonic pulse train).

Thereafter, the other processes that are the same as those in the first embodiment are carried out to determine the coordinates.

As described above, in the second embodiment, the time elapsed between receiving an ultrasonic pulse train and receiving the succeeding ultrasonic pulse train is determined by multiplying the time between receiving a pulse of the light signal and receiving the succeeding pulse of the light signal by the factor h.

Although reference has been made to the cases where p=2 and q=2, it is obvious that the first embodiment allows $p \geq 2$ and $q \geq 1$, and the second embodiment allows $p \geq 1$ and $q \geq 2$. The factor h is preset such that $h/f_S$, which is a coordinate-sampling interval, becomes a desired value that should be larger than the maximum propagation time required for the ultrasonic signal travels from the pen on the input plane to the ultrasonic receivers.

Figure 7:
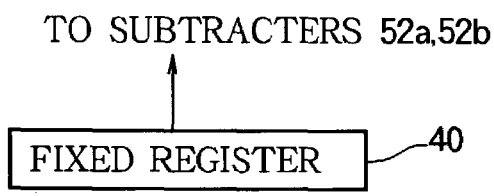
FIG. 7 is a block diagram explaining a circuit structure of a coordinate-capturing apparatus of a third embodiment.

The third embodiment will now be described. In this embodiment, $''Nc^m_R$ and $''Nc^m_L$ measured in the first embodiment and $''Nc$ measured in the second embodiment are not used, but $[h/f_S] \cdot F_D$ calculated beforehand is used instead of $h \cdot ''Nc^m_R$ and $h \cdot ''Nc^m_L$, or $h \cdot ''Nc$. The third embodiment is a modification of the first embodiment shown in FIG. 4, in which the counter circuits 28a, 28b, the registers 29a, 29b, and the multipliers 51a, 51b are removed, and the output of a fixed register 40 storing the value of $[h/f_S] \cdot F_D$ is supplied to the subtracters 52a, 52b as shown in FIG. 7. It is obvious that the third embodiment allows $p \geq 1$ and $q \geq 1$. The third embodiment can be used when the frequency of emission of the ultrasonic wave group ($f_S/h$) is constant. If the frequency varies by a large amount, its position-detection accuracy is deteriorated. If the frequency variation is small, it is possible to reduce power consumption in the pen and to simplify the circuit structure of its receiver side without deteriorating the accuracy.

In the above-described first to third embodiments, the ultrasonic signal is emitted intermittently, whereas, in the below-described fourth to seventh embodiments, the ultrasonic signal is emitted continuously.

Figure 8:
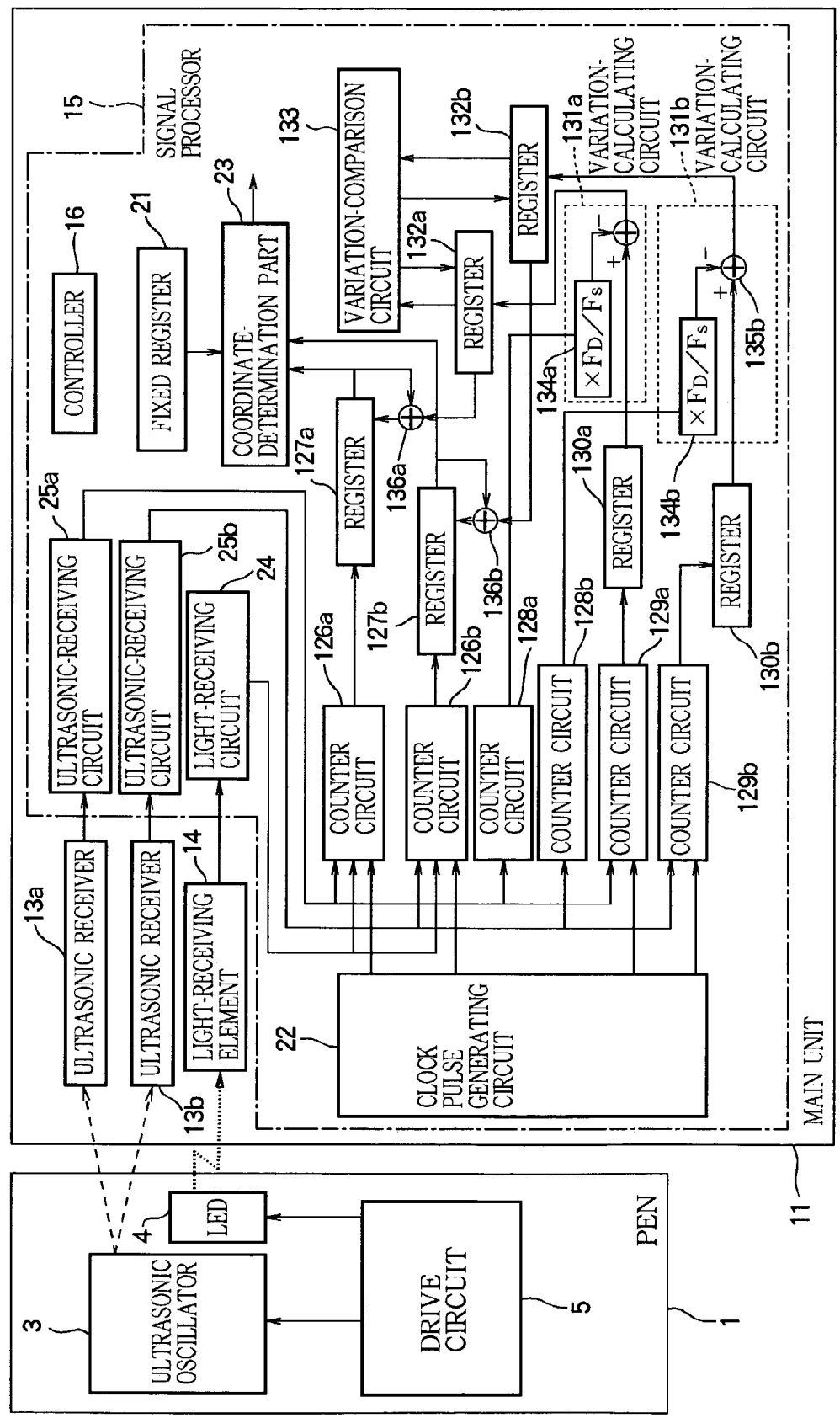
FIG. 8 is a block diagram showing a circuit structure of a coordinate-capturing apparatus of a fourth embodiment.

FIG. 8 shows a circuit structure of the fourth embodiment. The structure of the fourth embodiment is about the same as the first embodiment. The reference numerals in FIG. 8 identical to those in FIG. 4 represent the same or corresponding elements.

In this embodiment, the drive circuit 5 is replaced by a drive circuit 105 that causes the ultrasonic oscillator 3 to emit the ultrasonic signal having the frequency $f_S$ continuously during the pen-down state. On the other hand, the drive circuit 105 causes the LED 4 to emit the light signal having a single pulse only once at the start of the pen-down state. This light signal serves as a start signal $E_R$.

The counter circuits 126a, 126b receive the outputs of the clock pulse generating circuit 22, the light-receiving circuit 24 and the ultrasonic-receiving circuits 25a, 25b, and count the clock pulses from the moment of generation of the start signal $E_R$ and the moment of generation of ultrasonic-reception signals. Thus, the times elapsed between the moment at which the ultrasonic signal is emitted from the ultrasonic oscillator 3 along with the start signal $E_R$ and the moment at which it is received by the ultrasonic receivers 13a, 13b can be measured.

The registers 127a, 127b hold the counts of the counter circuits 126a, 126b after completion of the counts (time measurement).

The counter circuits 128a, 128b receive the outputs of the ultrasonic-receiving circuits 25a, 25b, and count the pulses of the ultrasonic-reception signals respectively. The counter circuits 129a, 129b receive the outputs of the clock pulse generating circuit 22 and the ultrasonic-receiving circuits 125a, 125b, and count the clock pulses respectively. As described later, the outputs of the counter circuits 128a, 128b and the counter circuits 129a, 129b, which are the count values for the same time period, are used to calculate distance variations in variation-calculating circuits 131a, 131b. The counts of the counter circuits 128a, 128b for a certain time period represent a time interval between emission of a certain part of the ultrasonic signal (m-th pulse, for example) and emission of a later part of this signal ((m+n)th pulse, for example) at the ultrasonic oscillator 3. The counts of the counter circuits 129a, 129b for the same time period represent the times elapsed until the ultrasonic receivers 13a, 13b receive the (m+n) th pulse after receiving the m-th pulse respectively. However, since the counter circuits 129a, 129b count the clock pulses of the frequency $F_D$, while the counter circuits 128a, 128b count the pulses of the frequency $f_S$, the registers 130a, 130b hold the counts of the counter circuits 129a, 129b after completion of the time measurement. Thereafter, the counter circuits 129a, 129b are reset (their counts are reset to the initial value 0) to provide for the next count.

The variation-calculating circuits 131a, 131b have multipliers 134a, 134b and subtracters 135a, 135b.

The multipliers 134a, 134b multiply the outputs of the counter circuits 128a, 128b by the constant $F_D/f_S$, respectively. It is for taking account of the frequency difference between the pulses counted by the counter circuits 128a, 128b and the pulses counted by the counter circuits 129a, 129b. Thus, the outputs of the multipliers 134a, 134b represent the time interval between emissions at the ultrasonic oscillator 3 in the same unit in which the elapsed time between receptions at the ultrasonic receivers 13a, 13b is represented.

The subtracters 135a, 135b subtract the outputs of the registers 130a, 130b from the outputs of the multipliers 134a, 134b, respectively. The outputs of the subtracters 135a, 135b, which are the outputs of the variation-calculating circuits 131a, 131b, represent variations of the distances from the input pen to the ultrasonic receivers 13a, 13b.

The registers 132a, 132b hold the outputs (distance variations) of the variation-calculating circuits 131a, 131b.

A variation-comparison circuit 133 determines whether the distance variations held in the registers 132a, 132b satisfy an expression (B6) or (B7) described later. If the variation-comparison circuit 133 determines that the expression (B6) or (B7) is satisfied, the values held in the registers 132a, 132b are added to the values held in the registers 127a, 127b. The results of the addition are held in the registers 127a, 127b.

The coordinate-determination part 23 calculates coordinates (for example, x-y coordinates) representing the position of the input pen by trigonometry from the value held in the fixed register 21, and the values representing the distances from the input pen to the ultrasonic receivers 13a, 13b held in the registers 127a, 127b. The result of the calculation is transferred to a not-illustrated memory or an external unit such as a computer, and held there.

Figure 9:
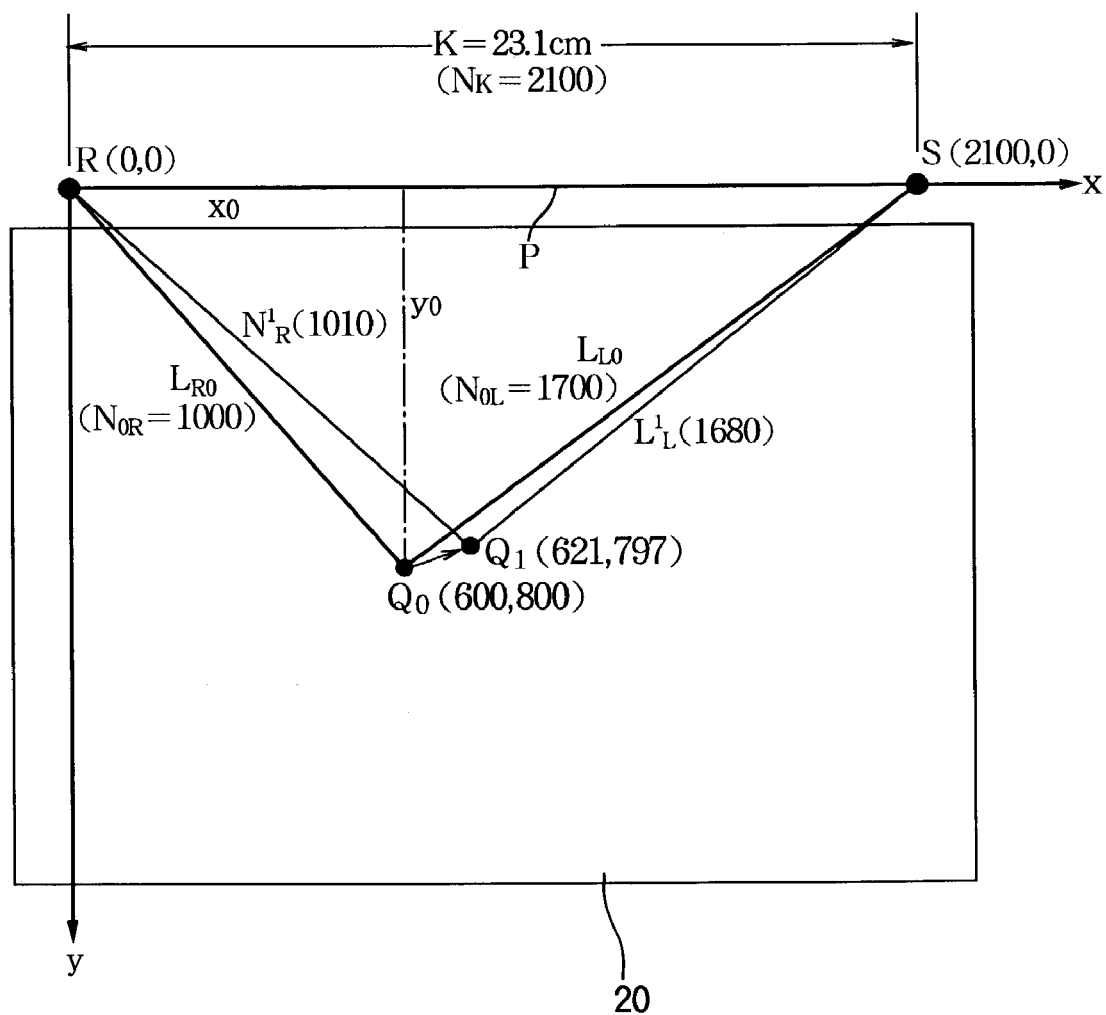
FIG. 9 is a view showing coordinates to be captured by the coordinate-capturing apparatus of the fourth embodiment.
Figure 10:
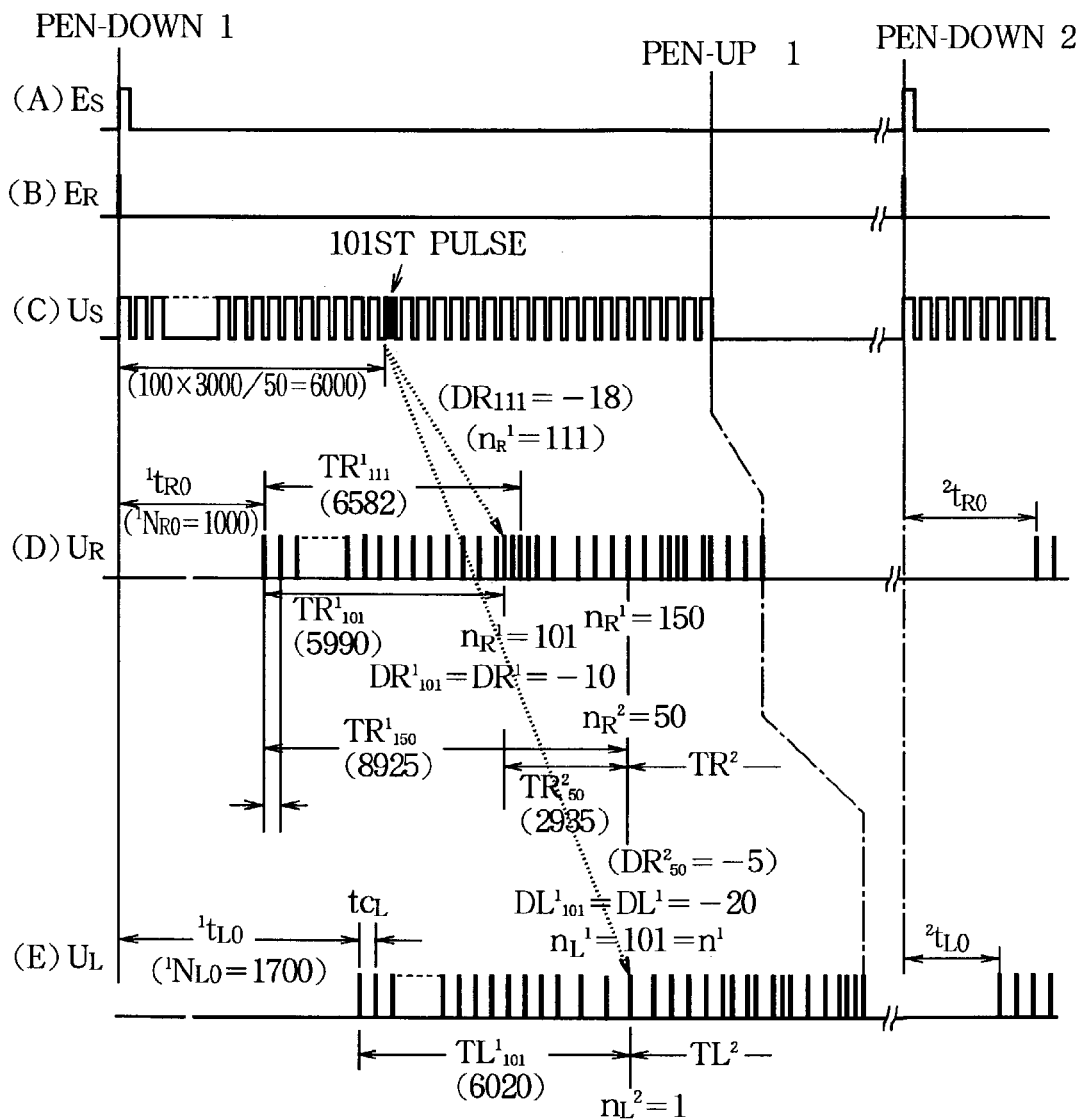
FIG. 10 is a time chart of various signals within the coordinate-capturing apparatus of the fourth embodiment.

The fourth embodiment will now be described with reference to FIG. 9 and FIG. 10. When the writing member 2 of the pen 1 comes into contact with the input plane 20 at the point $Q_0$ as shown in FIG. 9, the not-illustrated switch of the input pen is turned onto cause the ultrasonic oscillator 3 to emit the ultrasonic signal $U_S$, and cause the LED 4 to emit the light signal $E_S$ at the same time through the drive circuit 105 shown in FIG. 8 (PEN-DOWN 1 in FIG. 10). As shown in FIG. 10(C), the ultrasonic signal $U_S$ is oscillating at the frequency $f_S$ while the writing member 2 is in contact with the input plane, that is, during the pen stroke. This ultrasonic signal $U_S$ is received by the ultrasonic receivers 13a, 13b, and converted into ultrasonic-reception signals $U_R$, $U_L$ (electric pulse signals) by the ultrasonic-receiving circuits 25a, 25b. The light signal $E_S$, which is a wave group including q pulses having the frequency p times (p being a positive integer) higher than the oscillation frequency $f_S$ of the ultrasonic oscillator, is emitted only once at the start of each pen stroke. FIG. 10(A) shows a case where p=1 and q=1. The light signal $E_S$ is received by the light-receiving element 14, and converted into a start signal $E_R$ (electric pulse signal) indicating the start of the pen down state by the light-receiving circuit 24. The times $^1t_{R0}$, $^1t_{L0}$ between generation of the start signal $E_R$ and generation of the ultrasonic-reception signals $U_R$, $U_L$ can be regarded as propagation times required for the ultrasonic signal to travel from the ultrasonic oscillator 3 to the ultrasonic receivers 13a, 13b, since the propagation time of the light signal is as small as negligible. The propagation times $^1t_{R0}$, $^1t_{L0}$ are clocked by the counter circuits 126a, 126b as the numbers $N^o_R$, $N^o_L$ of the clock pulses having the frequency $F_D$=3 MHz generated by the clock pulse generating circuit 22. The numbers $N^o_R$, $N^o_L$ of the clock pulses, which translate into the distances $L^o_R$, $L^o_L$ between the point $Q_0$ and the ultrasonic receivers 13a, 13b, are temporarily stored as equivalents of the distances in the registers 127a, 27b. The above equivalents $N^o_R$, $N^o_L$ are expressed in the same unit with $N_K$ that is the equivalent of the distance between the ultrasonic receivers. As seen from FIG. 9, three line-segments connecting the above $N^o_R$, $N^o_L$ and $N_K$ form a triangle. The coordinate-determination part 23 determines the position of the point $Q_0$ as its coordinates $Q_0$ ($x_0$, $y_0$) in the x-y coordinate system in accordance with the following equations (B2), (B3) by trigonometry. The coordinates determined are stored in a not-illustrated memory or transferred to an external unit such as a computer.

$$[N^o_R]2 = [x_0]^2 + [y_0]^2 \quad (B2)$$

$$[N^o_L]2 = [N_K - x_0]^2 + [y_0]^2 \quad (B3)$$

If $N^o_R$=1000 and $N^o_L$=1700 when $F_D$=3 MHz, $x_0$=600 and $y_0$=800 are calculated from $N_K$=2100, and are stored in a not illustrated memory or transferred to a not illustrated external unit such as a computer.

The switch of the pen remains closed while the input pen 1 is in contact with the input plane 20, that is, during the pen stroke. Accordingly, the oscillation of the ultrasonic signal $U_S$ continues and the pulses of the ultrasonic reception signals $U_R$, $U_L$ are delivered continuously. The counter circuits 128a, 128b continue to count the numbers $n_R$, $n_L$ of these pulses, and the counter circuits 129a, 129b continue to count the numbers TR, TL of the clock pulses generated by the clock pulse generating circuit 22 at the frequency $F_D$ as equivalents of the times $t_R$, $t_L$ elapsed from the starts of the ultrasonic reception signals $U_R$, $U_L$ respectively. The numbers TR, TL of the pulses in the counter circuits 129a, 129b when the counter circuits 128a, 128b count up to $n^1_R$, $n^1_L$ respectively, are successively stored in the registers 130a, 130b as $TR^1(n^1_R)$ and $TL^1(n^1_L)$. Furthermore, their respective variations $DR^1(n^1_R)$, $DL^1(n^1_L)$ are calculated every moment by the variation-calculating circuits 131a, 131b according to the following equations (B4) and (B5) and successively stored in the registers 132a, 132b respectively.

$$DR^1{}_{(n^1{}_R)} = TR^1{}_{(n^1{}_R)} - [n^1{}_R - 1] \cdot F_D / f_S \quad \text{(B4)}$$

$$DL^1{}_{(n^1{}_L)} = TL^1{}_{(n^1{}_L)} - [n^1{}_L - 1] \cdot F_D / f_S \quad \text{(B5)}$$

The variation-comparison circuit 133 compares the absolute values of the variations $DR^1{}_{(n^1{}_R)}$, $DL^1{}_{(n^1{}_L)}$ with a predetermined value d to determine whether the following inequalities (B6), (B7) are satisfied.

$$|DR^1{}_{(n^1{}_R)}| \geq d, |DL^1{}_{(n^1{}_L)}| < d(n^1{}_L = 1, 2, \ldots n^1{}_R) \quad \text{(B6)}$$

$$|DL^1{}_{(n^1{}_L)}| \geq d, |DR^1{}_{(n^1{}_R)}| < d \ (n^1{}_R = 1, 2, \ldots n^1{}_L) \quad \text{(B7)}$$

If either of the inequalities (B6), (B7) is satisfied when an $n^1$-th pulse of the ultrasonic signal $U_S$ emitted from the pen situated at the position $Q_1$, which had been moved from the $Q_0$, has arrived at the ultrasonic receivers, the variations $DR^1{}_{(n^1{})}$, $DL^1{}_{(n^1{})}$ corresponding to the $n^1$-th pulse are output from the registers 132a, 132b as the first variations $DR^1$, $DL^1$ and added to the values stored in the registers 127a, 127b by the adders 136a, 136b. The results of the addition are held in the registers 127a, 127b. Thus, the values stored in the registers 127a, 127b become distance-equivalent values $N^1{}_R$, $N^1{}_L$ expressed in the following equations (B8) and (B9)

$$N^1{}_R = N^0{}_R + DR^1 \quad \text{(B8)}$$

$$N^1{}_L = N^0{}_L + DL^1 \quad \text{(B9)}$$

The coordinate-determination part 23 determines the coordinates $Q_1(x_1, y_1)$ of the point $Q_1$ from the values of $N^1{}_R$, $N^1{}_L$ and $N_K$, and stores them in the not illustrated memory or transfers them to the not illustrated external unit such as a computer.

The inequalities (B6), (B7) are satisfied when the distance variation exceeds the value of d. As described above, each time the distance variation exceeds the predetermined value, this variation is added to the distance value (the value stored in the register 127a or 127b) determined by the preceding calculation, and the result of the addition is stored in the register 127a or 127b as a new distance value. The coordinate-determination part 23 determines new coordinates based on this new distance value.

The calculation of the distance variation in the variation-calculating circuit 131a or 131b can be performed each time the number of the pulses counted by the counter circuit 128a or 128b reaches a predetermined number, or each time the number of the pulses counted by the counter circuit 129a or 129b reaches a predetermined number.

FIG. 10 shows a case where $DR^1{}_{111}$ becomes −18 when $n^1{}_R = 111$ and thereby the inequality (B6) ($|DR^1{}_{(n^1{}_R)}| \geq 15$) is first satisfied under the conditions of the oscillation frequency of the ultrasonic signal being 50 KHz and the value d being 15. Subsequently, when $n^1{}_L = 101$, $DL^1{}_{101}$, becomes 20 to satisfy the inequality (B7). However, the inequality (B6) is not satisfied since $n^1{}_R$ becomes 150 at that moment. Therefore, the value of $DL_{1101}$ is added to the value in the register 127b as $DL^1 = 20$, and $n^1{}_L = 101 = n^1$. On the other hand, if the value of $DR^1{}_{101}$ stored in the register 132a is −10 at that moment, the value of $DR^1{}_{101}$ is added to the value stored in the register 127a as $DR^1 = -10$. In consequence, the values of $N^1{}_R$ and $N^1{}_L$ held in the registers 127a and 127b are changed as $N^1{}_R = 1010$, $N^1{}_L = 1680$ respectively according to the equations (B8) and (B9). The coordinate-determination part 23 determines the coordinates of the point $Q_1$ as $Q_1$ (621, 797) from the three values of $N^1{}_R = 1010$, $N^1{}_L = 1680$ and $N_K = 2100$. What is meant by the above determination will be explained below. When the ultrasonic oscillator 3 emits the first pulse, the writing member 2 of the pen 1 is at the point $Q_0$. The pen is moving, and therefore the writing member is at the point $Q_1$ when $n^1{}_1 = 101$, that is, $100 \cdot 1/f_S$ after the emission of the first pulse. In other words, the writing member 2 is at the point $Q_1$ after 6000 ($100 \cdot F_D / f_S = 100 \times 3000/50$) clock pulses of the frequency $F_D$ are generated when the 101st ultrasonic pulse is just emitted. At that moment, $TR^1{}_{101}$ and $TL^1{}_{101}$ represent, in the numbers of the clock pulses having the frequency $F_D$, the times between reception of the first ultrasonic pulse and reception of the 101st ultrasonic pulse by the ultrasonic receivers 13a, 13b that are equivalents of the propagation times required for the ultrasonic signal travel from the point $Q_1$ to the ultrasonic receivers 13a, 13b. Accordingly, the variations $DR^1{}_{101}$, $DL^1{}_{101}$ represent a travel of the writing member 2 with respect to the ultrasonic receivers 13a, 13b corresponding to the movement of the writing member from the point $Q_0$ to the pint $Q_1$. What is meant by $DR^1{}_{101} = -10$ and $DL^1{}_{101} = 20$ is that the pen is moving closer to the ultrasonic receiver 13a and moving away from the ultrasonic receiver 13b.

When either of the inequalities (B6), (B7) is satisfied, the counts of the counter circuits 128a, 128b are reduced by $[n_1 - 1]$ to become $n^2{}_R$ and $n^2{}_L$ respectively to provide for the next counts. Furthermore, the count of the counter circuit 129a is reduced by the value of $TR^1{}_{(n^1{}_1)}$ held in the register 130a to become $TR^2{}_{(n^2{}_R)}$, and the count of the counter circuit 129b is reduced by the value of $TL^1{}_{(n^1{}_1)}$ held in the register 130b to become $TL^2{}_{(n^2{}_L)}$ to provide for the next counts. The register 130a holding the values corresponding to $TR^1{}_1$ to $TR^1{}_{(n^1{})}$, and the register 130b holding the values corresponding to $TL^1{}_1$ to $TL^1{}_{(n^1{})}$ are reset to provide for storing new values as $TR^2{}_{(n^2{}_R)}$ and $TL^2{}_{(n^2{}_L)}$ respectively. Likewise, the register 132a holding the values corresponding to $DR^1{}_1$ to $DR^1{}_{(n^1{})}$, and the register 132b holding the values corresponding to $DL^1{}_1$ to $DL^1{}_{(n^1{})}$ are reset to provide for storing new values as $DR^2{}_{(n^2{}_R)}$ and $DL^2{}_{(n^2{}_L)}$ respectively. A new variation $DR^2{}_{(n^2{}_R)}$ or $DL^2{}_{(n^2{}_L)}$ is calculated from $TR^2{}_{(n^2{}_R)}$ or $TL^2{}_{(n^2{}_L)}$ held in the register 130a or 130b which has been just reset and $n^2{}_R$ or $n^2{}_L$ on the basis of the following equation (B10) or (B11) which is equivalent of the equation (B4) or (B5). The register 132a or 132b holding data for more than $n^1$ pulses at the time of above reset is rewritten to have the above new variation to provide for the next operation.

$$DR^2{}_{(n^2{}_R)} = TR^2{}_{(n^2{}_R)} - [n^2{}_R - 1] \cdot F_D / f_S \quad \text{(B10)}$$

$$DL^2{}_{(n^2{}_R)} = TL2{}_{(n^2{}_L)} - [n^2{}_L - 1] \cdot F_D / f_S \quad \text{(B11)}$$

In the case of FIG. 10 where the inequality (B7) is satisfied when $n^1 = 101$, the count of the counter circuit 128a is 150, $DL^1{}_{101}$ held in the register 132b is 20, and $DR^1{}_{101}$ held in the register 132a is −10 when the count of the counter circuit 128b reaches 101. At that moment, the variation-calculating circuits 131a, 131b output $DR^1 = -10$ and $DL^1 = 20$, so that the count of the counter circuit 128a is reduced by $[101-1] = 100$ to change from 150 to $n^2{}_R = 50$, and the count of the counter circuit 128b is reduced by 100 to change from 101 to $n^2{}_L = 1$. New counts start from this state. The count of the counter circuit 129b is $TL^2{}_1 = 0$ since $TL^1{}_{101}(6000+20=6020) - TL^1{}_{101} = 0$, and the count of the counter circuit 129a is, if $TR^1{}_{150}$ has reached 8925 at that moment, $TR^2{}_{50} = 2935$ since $TR_{150}(8925) - TR_{101}(6000-10=5990) = 2935$. New counts start from this state. The register 130b holds $TL^21 = 0$, and the register 132b holds $DL^21 = 0$ under such a reset state. On the other hand, the values corresponding to $TR^1{}_{101}$ to $TR^1{}_{150}$ held in the register 130a at that moment are reduced by $TR^1{}_{101} = 5990$ respectively and are left in the register 130a as the values corresponding to $TR^2_1$ to $TR^2_{50}$. The register 132a holding the values corresponding to $DR^1_{101}$ to $DR^1_{150}$ at that moment are rewritten to hold the values of $DR^2_1$ to $DR^2_{50}$ that are calculated from the values of $TR^2_1$ to $TR^2_{50}$ currently held in the register 130a. For example, $DR^2_{50}=TR^2_{50}-49\times 60=2935-2940=-5$.

The moment at which the $n^1$-th pulse of the ultrasonic signal is emitted is used as a reference time for carrying out a second sampling. That is, a process similar to the above-described process for determining the coordinates of the point $Q_1$ is carried out regarding that a first pulse for the second sampling is emitted at this moment. If the pen is at the position $Q_2$ when an $n^2$-th pulse of the ultrasonic signal is emitted after the new reference time, and the arrival of this $n^2$-th pulse at the ultrasonic receiver satisfies one of the following inequalities (B12) and (B13) that are the equivalents of the inequalities (B6) and (B7), $$|DR^2_{(n^2_R)}|\geq d, |DL^2_{(n^2_L)}|<d(n^2_L=1, 2, \ldots n^2_R) \quad (B12)$$

$$|DL^2_{(n^2_L)}|\geq d, |DR^2_{(n^2_R)}|<d(n^2_R=1, 2, \ldots n^2_L) \quad (B13)$$

The variations $DR^2_{(n_2)}$ and $DL^2_{(n^2)}$ with respect to the $n^2$-th pulse are output from the variation-calculating circuits 131a, 131b as variations $DR^2$, $DL^2$, and $N^2_R$ and $N^2_L$ are determined according to the following equations (B14) and (B15) that are the equivalents of the equations (B8) and (B9).

$$N^2_R=N^1_R+DR^2 \quad (B14)$$

$$N^2_L=N^1_L+DL^2 \quad (B15)$$

The coordinate-determination part 23 determines the coordinates $Q_2$ $(x_2, y_2)$ of the point $Q_2$ from the $N^2_R$, $N^2_L$ and $N_K$, and stores them in the not illustrated memory or transfers them into the not illustrated external unit such as a computer.

By carrying out an m-th sampling, $DR^m(n^m_R)$ and $DL^m(n^m_L)$ are calculated according to the following equations (B16) and (B17).

$$DR^m_{(n^m_R)}=TR^m_{(n^m_R)}-[n^m_R-1]\cdot F_D/f_S \quad (B16)$$

$$DL^m_{(n^m_L)}=TL^m_{(n^m_L)}-[n^m_L-1]\cdot F_D/f_S \quad (B17)$$

Subsequently, when the following inequalities (B18) and (B19) are satisfied, $$|DR^m_{(n^m_R)}|\geq d, |DL^m_{(n^m_L)}|<d(n^m_L=1, 2, \ldots n_R) \quad (B18)$$

$$|DL^m_{(n^m_L)}|\geq d, |DR^m_{(n^m_R)}|<d(n^m_R=1, 2, \ldots n_L) \quad (B19)$$

$N^m_R$ and $N^m_L$ are determined according to the following equations (B20) and (B21) as $DR^m_{(n^m_R)}=D^R_m$, $DL^m_{(n^m_L)}=DL^m_L$.

$$N^m_R=N^{(m-1)}_R+DR^m \quad (B20)$$

$$N^m_L=N^{(m-1)}_L+DL^m \quad (B21)$$

Then, the coordinates $Q_m$ $(x_m, y_m)$ of the point $Q_m$ are determined, and stored in the not illustrated memory or transferred to the not illustrated external unit such as a computer.

Thereafter, when the writing member 2 separates from the input plane 20, the switch (not illustrated) of the pen 1 is turned off, and thereby the oscillation of the ultrasonic oscillator 3 ceases (PEN-UP 1 in FIG. 10). In consequence, the counter circuits 126a, 126b, 128a, 128b, 129a, and 129b, and the registers 127a, 127b, 130a, 130b, 132a, and 132b are reset, and then a series of coordinates determined while the writing member 2 is in contact with the input plane 20 is stored in the memory or transferred to the external unit as stroke data.

When the writing member 2 again comes into contact with the input plane and the switch of the pen 1 is turned on, measurement of the propagation times $^2t_{R0}$ and $^2t_{L0}$ is started for determining the initial position of the pen in the second pen stroke (PEN-DOWN 2 in FIG. 10). By carrying out the above-described processes, a series of coordinates for the second pen stroke is determined and stored in the memory or transferred to the external unit.

In the above described embodiment, p=1 and q=1, however, it is obvious that p and q can be any positive integer.

The fourth embodiment described above can perform coordinate-determination smoothly even when the pen is moving fast, since the ultrasonic oscillator oscillates continuously during a pen stroke and timing of coordinate-sampling is determined based on the amount of the travel of the pen.

However, in the fourth embodiment, when determining coordinates of points after $Q_1$ in accordance with appropriate expressions such as equations (B16) and (B17), since $[F_D/f_S]$ used in the multipliers 134a, 134b is a predetermined constant, an error may occur in the calculation due to pen-to-pen variation in the oscillation frequency $f_S$. The fifth embodiment described below aims at solving this problem.

The fifth embodiment will now be described. The structure of the fifth embodiment is the same as the fourth embodiment as a whole. The difference is in the circuit structures of variation determination circuits 140a, 140b. The variation-calculating circuits 140a, 140b replacing the variation-calculating circuits 131a, 131b, have reference-time detecting circuits 141a, 141b, registers 142a, 142b, multipliers 143a, 143b, and subtracters 144a, 144b.

The reference-time detecting circuits 141a, 141b receive the output (clock pulses) of the clock pulse generating circuit 22 and the outputs of the ultrasonic-receiving circuits 25a, 25b to determine the ratio $F_D/f_S$ by counting the clock pulses over one or more cycles of the ultrasonic signal. For example, if the count of the clock pulses for n cycles of the ultrasonic signal is m, $F_D/f_S$ equals to m/n. To be more specific, in the fourth embodiment, the clock pulses generated by the clock pulse generating circuit 22 is counted over the period $tc_R$ or $tc_L$ of the first cycle of the ultrasonic reception signal $U_R$ or $U_L$ shown in FIG. 10(D) or (E) for each pen stroke, and the count $N_{UR}$ or $N_{UL}$ is determined as $F_D/f_S$.

The registers 142a, 42b hold the ratio $F_D/f_S$ determined by the reference-time detecting circuits 141a, 141b.

The multipliers 143a, 143b multiply the outputs of the registers 142a, 142b by the outputs of the counter circuits 128a, 128b respectively.

The subtracters 144a, 144b subtract the outputs of the multipliers 143a, 143b from the outputs of the registers 130a, 130b respectively.

The multipliers 143a, 143b, and the subtracters 144a, 144b are used to calculate distance variations $D'R^m(n^m_R)$ and $D'L^m(n^m_L)$ in accordance with the following equations (B22), (B23).

$$D'R^m_{(n^m_R)}=TR^m_{(n^m_R)}-[n^m_R-1]\cdot N_{UR} \quad (B22)$$

$$D'L^m_{(n^m_L)}=TL^m_{(n^m_L)}-[n^m_L-1]\cdot N_{UL} \quad (B23)$$

The distance variations $D'R^m(n^m_R)$ and $D'L^m(n^m_L)$ are stored in the registers 132a, 132b. The other processes carried out in the fifth embodiment are the same as those carried out in the fourth embodiment.

As described above, the fifth embodiment differs from the fourth embodiment in that $[F_D/f_S]$ is replaced by $N_{UR}$ or $N_{UL}$ in the equations (B16), (B17).

In the fifth embodiment, since $F_D/f_S$ is determined by actually measuring the oscillation frequency of the ultrasonic oscillator of the pen by counting the clock pulses, it is possible to eliminate errors due to pen-to-pen variation in the oscillation frequency $f_S$.

Figure 12:
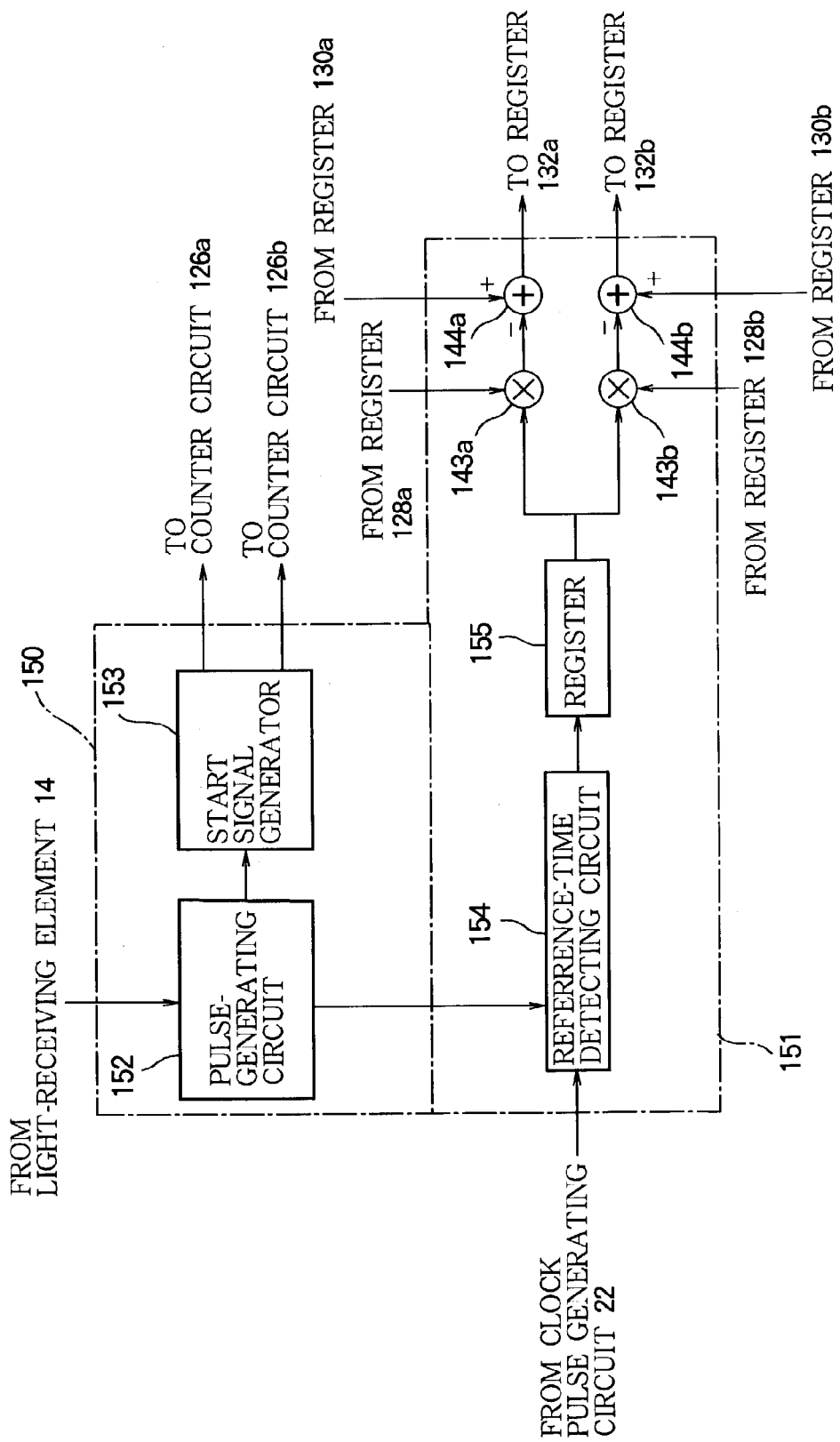
FIG. 12 is a block diagram explaining a circuit structure of a coordinate-capturing apparatus of a sixth embodiment.

The sixth embodiment where p=3 and q=2 will be described below. The structure of the sixth embodiment is about the same as that of the fourth embodiment. The difference is in a different light-receiving circuit 150 and a variation-calculating circuit 151 shown in FIG. 12.

The light-receiving circuit 150 replacing the light-receiving circuit 24 in the fourth embodiment includes a pulse-generating circuit 152 and a start signal generator 153. The pulse-generating circuit 152 converts a light signal $E_P$ (FIG. 13(B)) into a pulse signal as a light reception signal $E_C$ (FIG. 13(C)).

The start signal generator 153 generates, in response to the output of the pulse-generating circuit 152, a start signal $E_R$ which is an equivalent of the start signal $E_R$ in the fourth embodiment.

The variation-calculating circuit 151, which replaces the variation-calculating circuits 140a, 140b, includes a reference-time detecting circuit 154, a register 155, multipliers 143a, 143b, and subtracters 144a, 144b.

The reference-time detecting circuit 154 measures a period $t_S$ of a first cycle of the light-reception signal $E_C$ by counting the number $N_S$ of the clock pulses generated by the clock pulse generating circuit 22 at the frequency $F_D$. The register 155 holds the result of the measurement.

Figure 11:
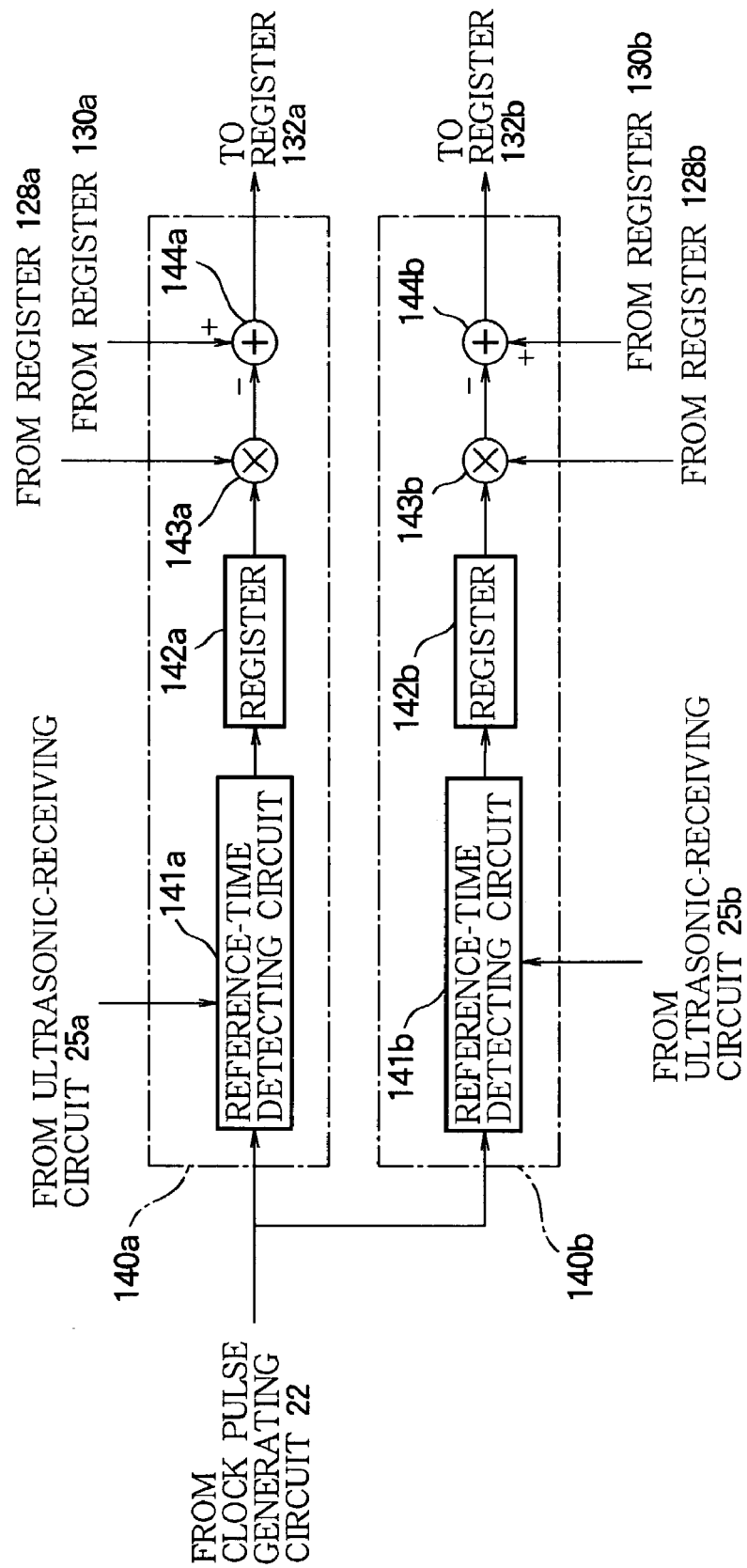
FIG. 11 is a block diagram explaining a circuit structure of a coordinate-capturing apparatus of a fifth embodiment.
Figure 13:
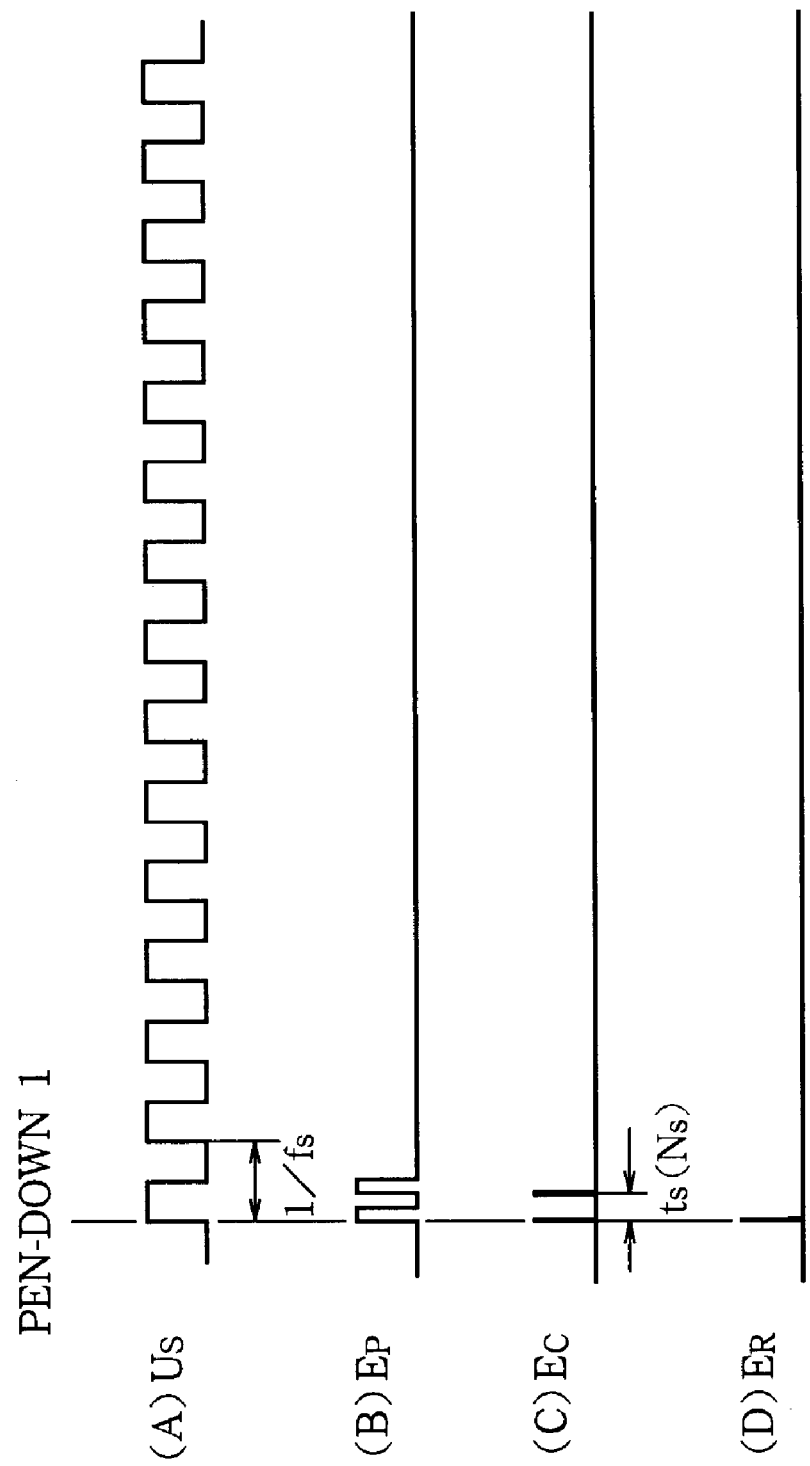
FIG. 13 is a time chart of various signals within the coordinate-capturing apparatus of the sixth embodiment.

The multipliers 143a, 143b, and the subtracters 144a, 144b are the same as those shown in FIG. 11. But one input of each of the multipliers 143a, 143b is connected to the register 155. FIG. 13(A) shows a waveform of the ultrasonic signal $U_S$ that is the same as the one in the fourth embodiment.

The multipliers 143a, 143b, and the subtracters 144a, 144b are used to calculate distance variations $D''R^m{}_{(n^m{}_R)}$ and $D''L^m{}_{(n^m{}_L)}$ according to the following equations B(24), B(25).

$$D''R^m{}_{(n^m{}_R)} = TR^m{}_{(n^m{}_R)} - [n^m{}_R - 1] \cdot p(=3) \cdot N_S \quad \text{(B24)}$$

$$D''L^m{}_{(n^m{}_L)} = TL^m{}_{(n^m{}_L)} - [n^m{}_L - 1] \cdot p(=3) \cdot N_S \quad \text{(B25)}$$

These calculated variations $D''R^m{}_{(n^m{}_R)}$ and $D''L^m{}_{(n^m{}_L)}$ are stored in the registers 132a, 132b. The other processes are the same processes as those in the fourth embodiment. That is, $[F_D/f_S]$ in the fourth embodiment is replaced by the above-described $N_S$. It is needless to say that the processes for determining coordinates used in the fourth embodiment can be used in the sixth embodiment as well, and q may be greater than two.

As described above, the sixth embodiment is arranged to count the clock pulses for one period of the light signal and obtain the product of the value of this count and the ratio of the period of the light signal to that of the ultrasonic signal as an equivalent of $[F_D/f_S]$.

The seventh embodiment of the invention where p=1 and q is infinite, that is, a case of continuous emission will now be described.

Figure 14:
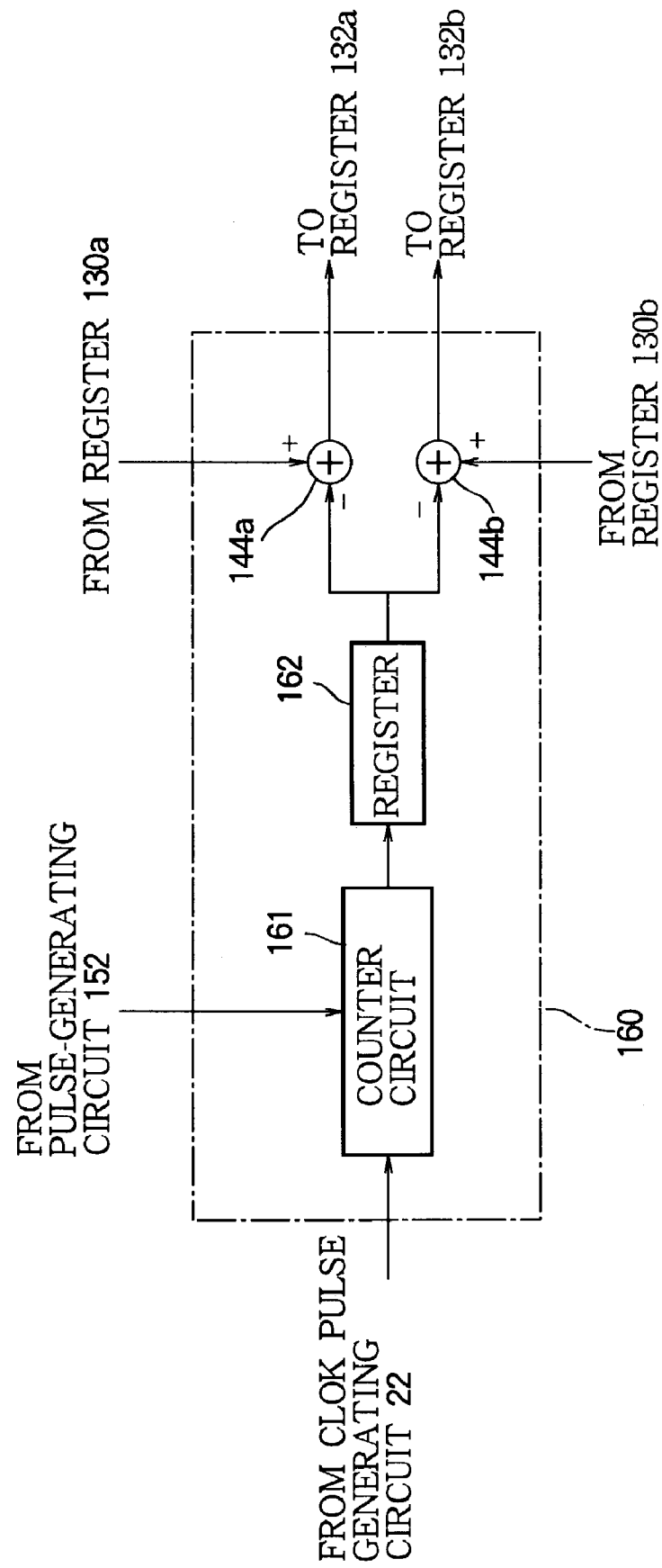
FIG. 14 is a block diagram explaining a circuit structure of a coordinate-capturing apparatus of a seventh embodiment.
Figure 15:
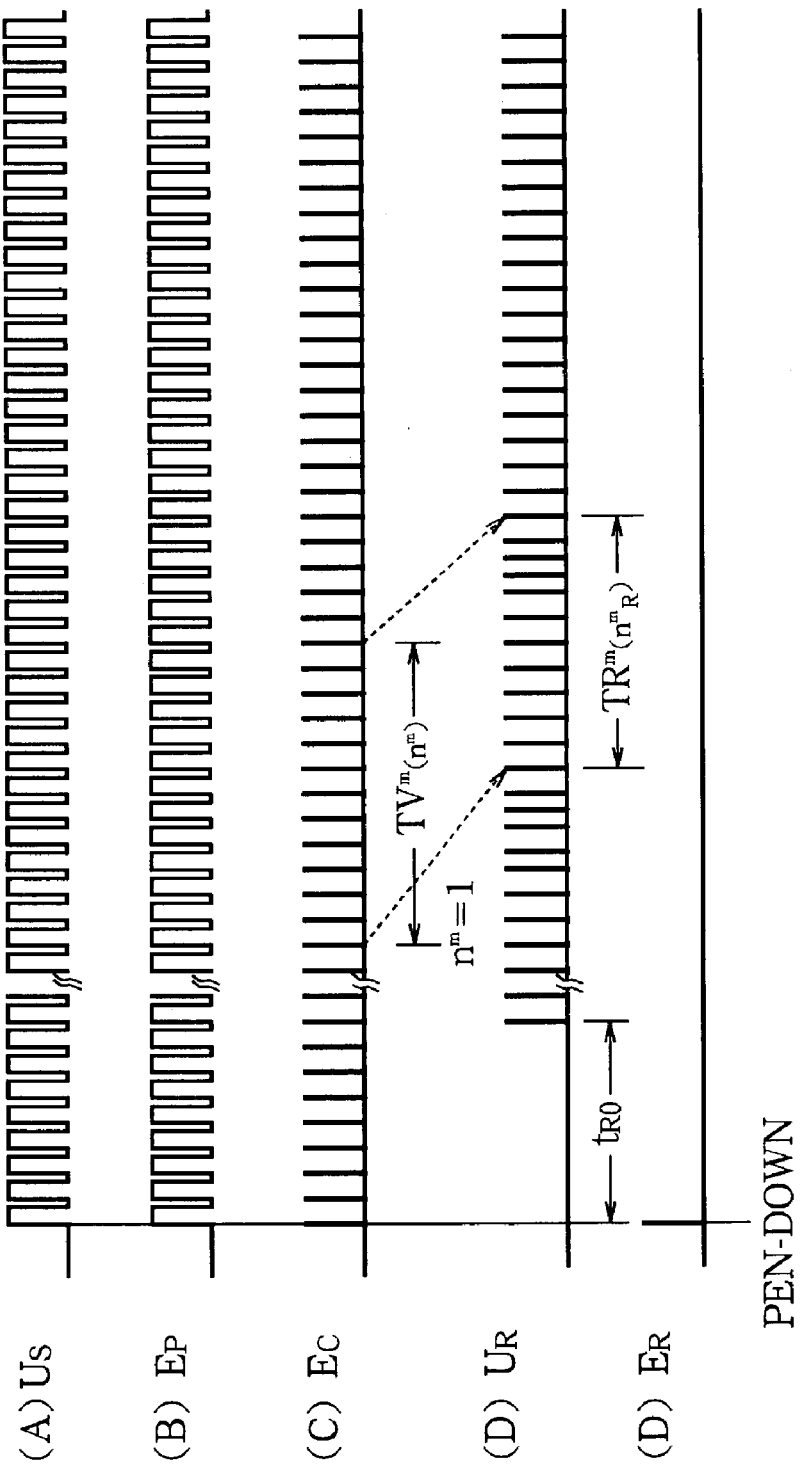
FIG. 15 is a time chart of various signals within the coordinate-capturing apparatus of the seventh embodiment.

The structure of the seventh embodiment is about the same as that of the sixth embodiment. The difference is in a variation-calculating circuit shown in FIG. 14. FIG. 15 shows signal waveforms in the seventh embodiment.

This variation-calculating circuit 160 has a counter circuit 161, a register 162, and multipliers 143a, 143b.

The counter circuit 161 measures a time period between a rise of a first pulse and a rise of an n-th pulse of the light-reception signal $E_C$ (FIG. 15(c)) corresponding to the light signal $E_P$ (FIG. 15(B)) in an m-th (m=1, 2, 3, . . . ) sampling by counting the number of the clock pulses having the frequency FD as $TV^m$ ($n^m$). The results of this measurement are successively stored in the register 162. The subtracters 144a, 144b subtract the output of the register 162 from the outputs of the registers 128a, 128b respectively. That is, the distance variations $D'''R^m{}_{(n^m{}_R)}$ and $D'''L^m{}_{(n^m{}_L)}$ are calculated according to the following equations (B26), (B27).

$$D'''R^m{}_{(n^m{}_R)} = TR^m{}_{(n^m{}_R)} - TV^m{}_{(n^m)} \quad \text{(B26)}$$

$$D'''L^m{}_{(n^m{}_L)} = TL^m{}_{(n^m{}_L)} - TV^m{}_{(n^m)} \quad \text{(B27)}$$

Thus calculated $D'''R^m{}_{(n^m{}_R)}$ and $D'''L^m{}_{(n^m{}_L)}$ are stored in the registers 132a, 132b. The other processes are the same as those in the fourth embodiment.

As described above, in the seventh embodiment, the light signal is emitted continuously in synchronization with the ultrasonic signal and the pulses of the light signal received by the light-receiving element are counted to measure an elapsed time between emission of the m-th pulse and emission of the (m+n)-th pulse of the ultrasonic signal at the ultrasonic oscillator.

The sixth and the seventh embodiments are arranged to measure the frequency of the light signal emitted from the pen side in synchronization with the ultrasonic signal at the receiving side, and to calculate the distance variation-based on the measured frequency. Therefore, they can determine coordinates accurately without being affected by the pen-to-pen variation in the emitting frequency.

The eighth embodiment, which is a variant of the fourth to seventh embodiments, will now be described.

In the fourth to seventh embodiments, the timing of coordinate acquisition (sampling timing) after $Q_1$ is determined to be an instant at which the inequality (B18) or (B19) is satisfied. However, it is also possible to initiate a sampling each time the number of the counted pulses of the continuously oscillating ultrasonic signal from the pen reaches a predetermined value. Accordingly, in this embodiment, the successive calculations of variations in the fourth to seventh embodiments are not performed, but calculations of $D'''R^m$ and $D'''L^m$ are performed instead according to the following equations (B28), (B29).

$$D'''R^m = TR^m - J \quad \text{(B28)}$$

$$D'''L^m = TL^m - J \quad \text{(B29)}$$

where $C^m$ is a variable coefficient;

$J = C^m \cdot F_D/f_S$ . . . (when applied to the fourth embodiment);

$J = C^m \cdot N_{UX}$ (X:R or L) . . . (when applied to the fifth embodiment)

$J = C^m \cdot N_S$ . . . (when applied to the sixth embodiment); and $J = TV^m{}_{(C^m)}$ . . . (when applied to the seventh embodiment).

Here, $D'''R^m$ and $D'''L^m$ are the same as $DR^m$ and $DL^m$ within the equations (B20) and (B21) used in the fourth to seventh embodiments, and Cm is set according to the followings. At the start of the stroke, that is, at the time of sampling $Q_1$, a fixed value $C^1$ is used. For subsequent samplings, $C^m$ is determined by comparing the absolute values of the last calculated $D'''R^m$ and $D'''L^m$ with the predetermined values $d_L$ and $d_S$ ($d_L > d_S$) To be more specific, $C^m$ is determined from an arithmetic progression $C_n$ prepared beforehand to satisfy the followings.

When $|D'''R^m| \geq d_L$ or $|D'''L^m| \geq d_L$ (B30), $C^{(m+1)} < C^m$ (B31).

When $|D'''R^m| \geq d_S$ or $|D'''L^m| \geq d_S$ (B32), $C^{(m+1)} > C^m$ (B33).

When the inequalities (B30) and (B32) are not satisfied, $C^{(m+1)} = C^m$ (B34).

The ninth embodiment, which is a variant of the fourth to eighth embodiments, will now be described. The fourth to eighth embodiments are described as "2-ultrasonic-wave+electromagnetic-wave type" system using a pen having an ultrasonic oscillator and a light emitter, however, they can be a "3-ultrasonic-wave type" system.

Figure 16:
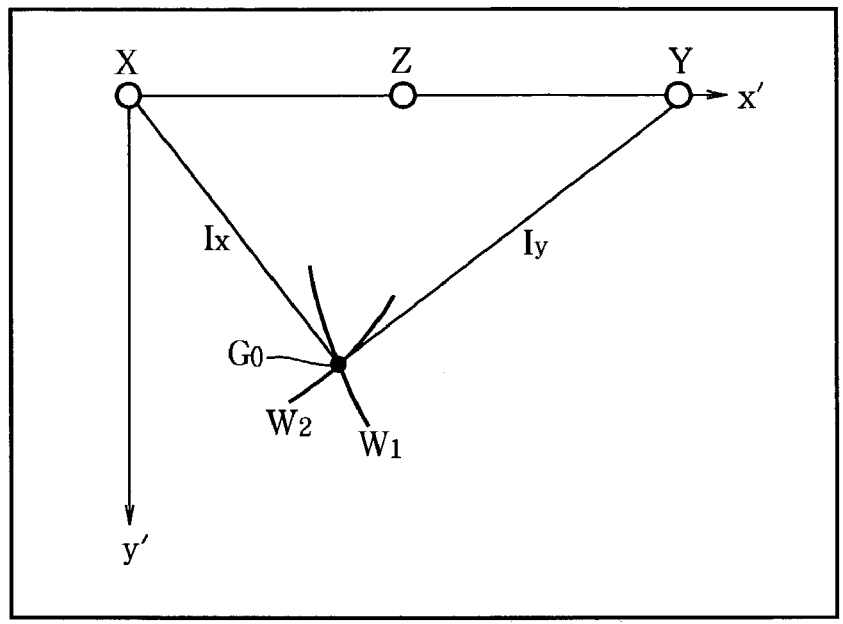
FIG. 16 is a view explaining a process for determining an input position in a coordinate-capturing apparatus of a ninth embodiment.

In this case, at least three ultrasonic receivers X, Y, Z are disposed on the same plane to receive the ultrasonic signal from the pen as shown in FIG. 16. When the pen comes into contact with the plane at the point G₀, the ultrasonic oscillator of the pen starts to emit the ultrasonic signal continuously. Then a hyperbolic curve w1 in the x'-y' coordinate system including the above X, Y, Z is determined from the difference of timings of receptions between the receivers X and Y, and likewise, another hyperbolic curve w2 in the x'-y' coordinate system is determined from the difference of timings of receptions between the receivers Y and Z. The position of the point G₀ is determined as the point of intersection of these hyperbolic curves w1 and w2. Subsequently, the distances $I_X$ and $I_Y$ between the point G₀ thus determined and the receivers X, Z are determined. Thereafter the same processes as those in the fourth, fifth or eighth embodiment is performed for determining coordinates of the position $G_m$ of the pen.

The tenth embodiment where the distance between the receivers 13a and 13b is made variable to adapt to input mediums of various widths will now be described.

Figure 17:
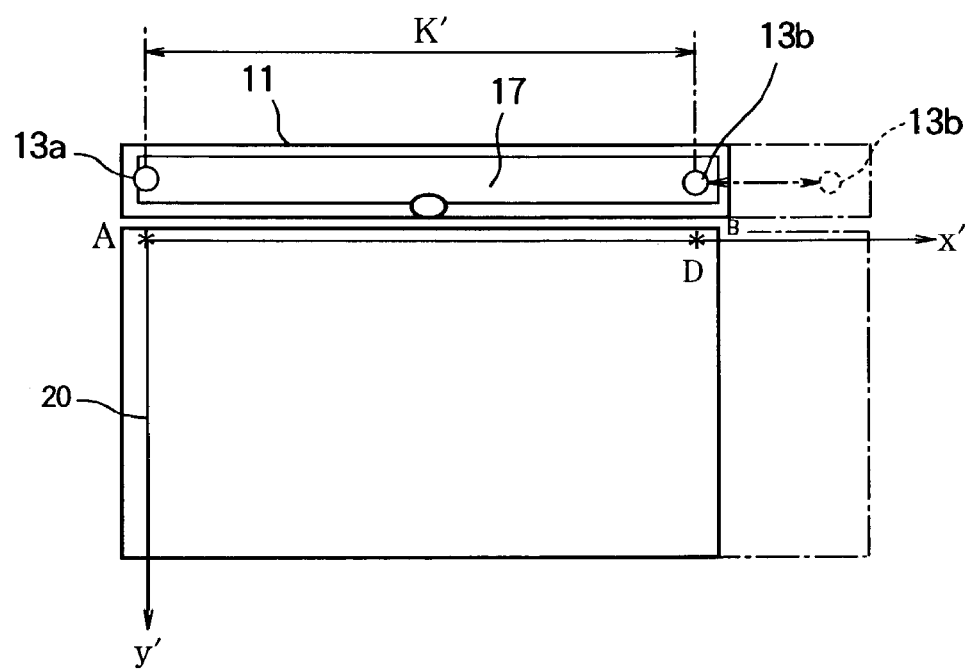
FIG. 17 is a top view of a coordinate-capturing apparatus of a tenth embodiment.
Figure 18:
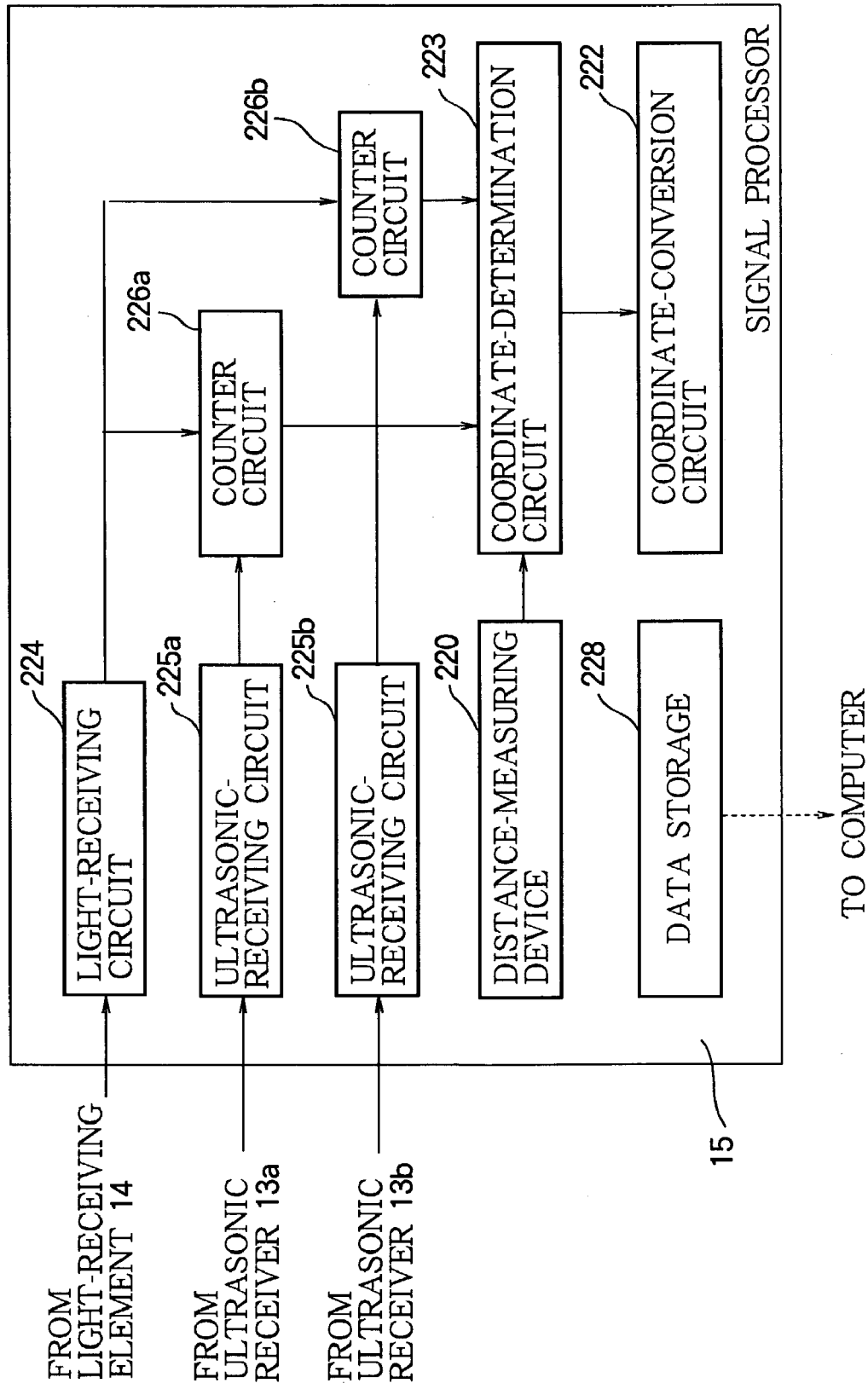
FIG. 18 is a block diagram explaining a circuit structure of the coordinate-capturing apparatus of the tenth embodiment.

The structure of this embodiment is about the same as the first embodiment. The difference is in that the ultrasonic receiver 13b is mounted so at to be position-adjustable as shown in FIG. 17, and the signal processor 15 is modified accordingly as shown in FIG. 18.

The signal processor 15 includes a coordinate-determination circuit 223 corresponding to the coordinate-determination part 23 of FIG. 8, a light-receiving circuit 224 corresponding to the light-receiving circuit 24 of FIG. 8, ultrasonic-receiving circuits 225a, 225b corresponding to the ultrasonic-receiving circuits 25a, 25b of FIG. 8, counter circuits 226a, 226b corresponding to the counter circuits 126a, 126b of FIG. 8. The signal processor 15 further includes a distance-measuring device 220 for measuring a variable distance K' between the ultrasonic receivers 13a and 13b, a coordinate-conversion circuit 222, and a data storage 228 for storing coordinates after coordinate-conversion.

At the time of writing into the form 20, the position of the receiver 13b is adjusted such that the distance K' is about the same as the length of the side AB of the form which is in contact with or close to the main unit 11. The distance K' measured by the distance-measuring device 220 is input to the coordinate-determination circuit 223 to be used as an equivalent of $N_K$ representing the distance between the receivers 13a and 13b. Then the points C, D at each end portion of the sides AB are pressed in turn by the pen to acquire x-y coordinates of the points C, D. Then a new x'-y' coordinate system whose origin point is the point C and whose x' axis is a straight line passing through the points C, D is established. After the process for sampling and acquiring x-y coordinates as described in the first embodiment is performed, the coordinate-conversion circuit 222 converts the x-y coordinates into x'-y' coordinates and stores them in the data storage 228.

With the tenth embodiment, it is possible to handle forms of various sizes. Especially, when a form of small size is used, since resolution in position determination is increased, small characters can be recognized accurately.

Although reference has been made to the cases where a light signal is emitted along with an ultrasonic signal from the pen as described in the first to eighth embodiments, electromagnetic waves for wireless transmission can be used instead of the light signal. The present invention is also applicable to a case where a timing signal is transmitted through a cable from the pen to the signal processor of the main unit. The coordinate-capturing apparatus of the present invention is not limited to the above described ultrasonic aerial-propagation type. It may be an ultrasonic in-medium propagation (surface acoustic wave) type. Furthermore, although it has been described that the timing signal and the ultrasonic signal are emitted only during the pen-down state, the present invention is applicable to a case where they are emitted all the time.

The above explained preferred embodiments are exemplary of the invention of the present application which is described solely by the claims appended below. It should be understood that modifications of the preferred embodiments may be made as would occur to one of skilled in the art.

The invention claimed is:

1. A coordinate-capturing apparatus comprising:
   (a) an input device that transmits a position-detecting signal and a timing signal;
   (b) a position detecting device comprising:
   first and second position-detecting signal receivers for receiving said position-detecting signal;
   a timing signal receiver for receiving said timing signal;
   a distance calculating device calculating distances between said input device and said first and second position-detecting signal receivers upon receiving said timing signal;
   said position detecting device calculating a first position of said input device on the basis of timing of reception of said position-detecting signal when said timing signal is received, and calculating a second position of said input device on the basis of information on periodicity of said position-detecting signal, information on a state of reception of said position-detecting signal, and said first position;
   a coordinate calculating device for calculating coordinates representing a position of said input device on the basis of said distances calculated by said distance calculating device; and
   a distance variation calculating device for calculating variations of said distances between said input device and said first and second position-detecting signal receivers on the basis of time periods between receptions of said position-detecting signal transmitted from said input device at a first time by said first and second position-detecting signal receivers respectively and receptions of said position-detecting signal transmitted from said input device at a second time by said first and second position-detecting signal receivers respectively;

in which said information on periodicity is a first time interval at which said position-detecting signal is transmitted, and said information on a state of reception is a second time interval at which said position-detecting signal is received.

2. The coordinate-capturing apparatus according to claim 1,
wherein the input device transmits at least two successive position-detecting signals at first intervals and a timing signal at second intervals longer than at least two first intervals; and
wherein said position detecting device calculates a position of the input device when the first position-detecting signal receiver and the second position-detecting signal receiver receive a preceding one of the at least two successive position-detecting signals after reception of the timing signal, the position being calculated based on a first elapsed time from receiving the timing signal until the first position-detecting signal receiver receives the preceding one of the at least two successive position-detecting signals and a second elapsed time from receiving the timing signal until the second position-detecting signal receiver receives the preceding one of the at least two successive position-detecting signals,
wherein said position detecting device calculates an amount of movement of the input device from the position when the first position-detecting signal receiver and the second position-detecting signal receiver receive the following one of the at least two successive position-detecting signals after reception of the timing signal, the amount of movement being calculated at least based on a third elapsed time from when the first position-detecting signal receiver receives the preceding one of the at least two successive position-detecting signals until the first position-detecting signal receiver receives the following one of the at least two successive position-detecting signals, and a fourth elapsed time from when the second position-detecting signal receiver receives the preceding one of the at least two successive position-detecting signals until the second position-detecting signal receiver receives the following one of the at least two successive position-detecting signals; and
wherein said position detecting device updates the position of the input device based on the amount of movement.

3. The coordinate-capturing apparatus according to claim 1, wherein the timing signal is a light signal and the position-detecting signal is an ultrasonic signal.

4. The coordinate-capturing apparatus according to claim 2, wherein the position detecting device calculates a first distance from the first position-detecting signal receiver to the input device based on the first elapsed time and a second distance from the second position-detecting signal receiver to the input device based on the second elapsed time, and then calculates the position based on the first distance and the second distance.

5. The coordinate-capturing apparatus according to claim 2, wherein said position detecting device calculates the amount of movement based on the first intervals, the third elapsed time, and fourth elapsed time.

6. The coordinate-capturing apparatus according to claim 1, wherein the position detecting device updates the position of the input device by adding the amount of movement to the position determined by the position-calculating section.

* * * * *